(12) United States Patent
Rom et al.

(10) Patent No.: US 7,621,116 B2
(45) Date of Patent: Nov. 24, 2009

(54) GAS TURBINE ENGINE SYSTEM

(75) Inventors: Haim Rom, Benyamina (IL); Guy Rom, Givatayim (IL)

(73) Assignee: Newton Propulsion Technologies, Ltd., Katzrin (IL)

( * ) Notice: Subject to any disclaimer, the term of this patent is extended or adjusted under 35 U.S.C. 154(b) by 208 days.

(21) Appl. No.: 10/570,017

(22) PCT Filed: Aug. 30, 2004

(86) PCT No.: PCT/IL2004/000785

§ 371 (c)(1),
(2), (4) Date: Oct. 11, 2006

(87) PCT Pub. No.: WO2005/021949

PCT Pub. Date: Mar. 10, 2005

(65) Prior Publication Data

US 2007/0051087 A1 Mar. 8, 2007

(30) Foreign Application Priority Data

Aug. 31, 2003 (IL) ............................. 157666

(51) Int. Cl.
*F02K 9/00* (2006.01)
(52) U.S. Cl. ............................................. 60/225
(58) Field of Classification Search ............... 60/226.1, 60/225
See application file for complete search history.

(56) References Cited

U.S. PATENT DOCUMENTS

| | | | |
|---|---|---|---|
| 3,214,907 A | 11/1965 | Martin | |
| 3,490,229 A * | 1/1970 | Hans-Christof | ............... 60/805 |
| 3,640,252 A | 2/1972 | Spinnett | |
| 3,843,284 A | 10/1974 | Spinnett | |
| 3,862,622 A | 1/1975 | Spinnett | |
| 3,863,610 A * | 2/1975 | Spinnett | ..................... 123/204 |
| 3,918,857 A | 11/1975 | Fitzgerald | |
| 4,545,198 A | 10/1985 | Yoshida | |
| 4,620,514 A | 11/1986 | Tseng | |
| 4,813,388 A | 3/1989 | Yang | |
| 5,165,238 A * | 11/1992 | Paul et al. | ..................... 60/682 |
| 5,212,942 A * | 5/1993 | Malohn | ....................... 60/784 |
| 5,471,834 A * | 12/1995 | Kapich | ........................ 60/269 |
| 5,692,372 A | 12/1997 | Whurr | |
| 6,000,214 A | 12/1999 | Scragg | |
| 6,526,937 B1 * | 3/2003 | Bolonkin | .................... 123/236 |
| 6,530,211 B2 | 3/2003 | Holtzapple et al. | |
| 2002/0004007 A1 * | 1/2002 | Doring et al. | ............... 415/203 |

FOREIGN PATENT DOCUMENTS

CA          1006442          3/1977

(Continued)

*Primary Examiner*—Michael Cuff
*Assistant Examiner*—Andrew Nguyen
(74) *Attorney, Agent, or Firm*—Fogg & Powers LLC

(57) ABSTRACT

An engine system comprises a first transfer positive displacement, volumetric device, at least one second positive displacement, volumetric device, and a transmission in engagement with two adjacent volumetric devices. The transmission has a ratio designed to cause the at least one second volumetric device to rotate at a higher angular velocity than the first volumetric device, inducing expansion of a compressible fluid during continuous flow from the first volumetric device to the at least one second volumetric device while performing work.

26 Claims, 26 Drawing Sheets

FOREIGN PATENT DOCUMENTS

| | | |
|---|---|---|
| DE | 42 41 403 | 7/1993 |
| EP | 0803639 | 10/1997 |
| FR | 2777943 | 10/1999 |
| JP | 46039884 | 11/1971 |
| JP | 57165631 | 10/1982 |
| JP | 62034937 | 2/1987 |
| JP | 63032129 | 2/1988 |
| JP | 63268938 | 11/1988 |
| JP | 04320718 | 11/1992 |
| JP | 06010703 | 1/1994 |
| JP | 08189420 | 7/1996 |
| JP | 2000352321 | 12/2000 |
| JP | 2001165561 | 6/2001 |
| JP | 2001193476 | 7/2001 |
| JP | 2001221001 | 8/2001 |
| WO | WO 83/01276 | 4/1983 |
| WO | 9956013 | 11/1999 |
| WO | 0006876 | 2/2000 |
| WO | WO 00/06876 | 2/2000 |
| WO | WO 03/067030 | 8/2003 |
| WO | WO 03/076779 | 9/2003 |

* cited by examiner

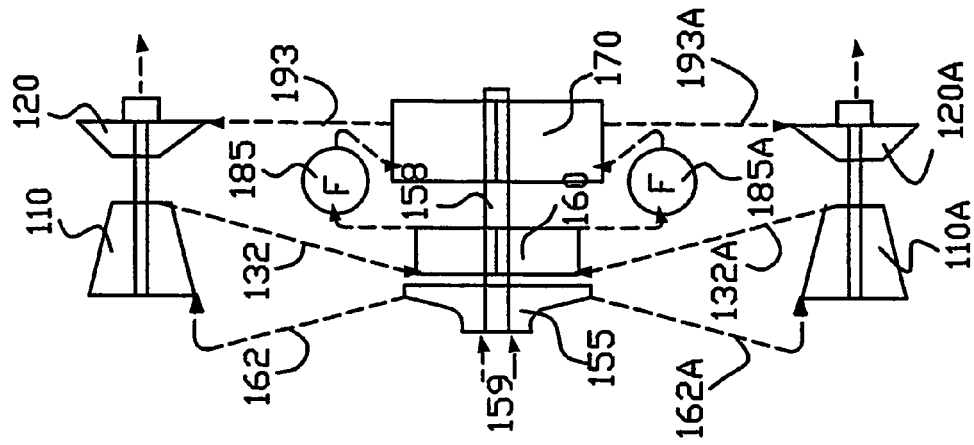
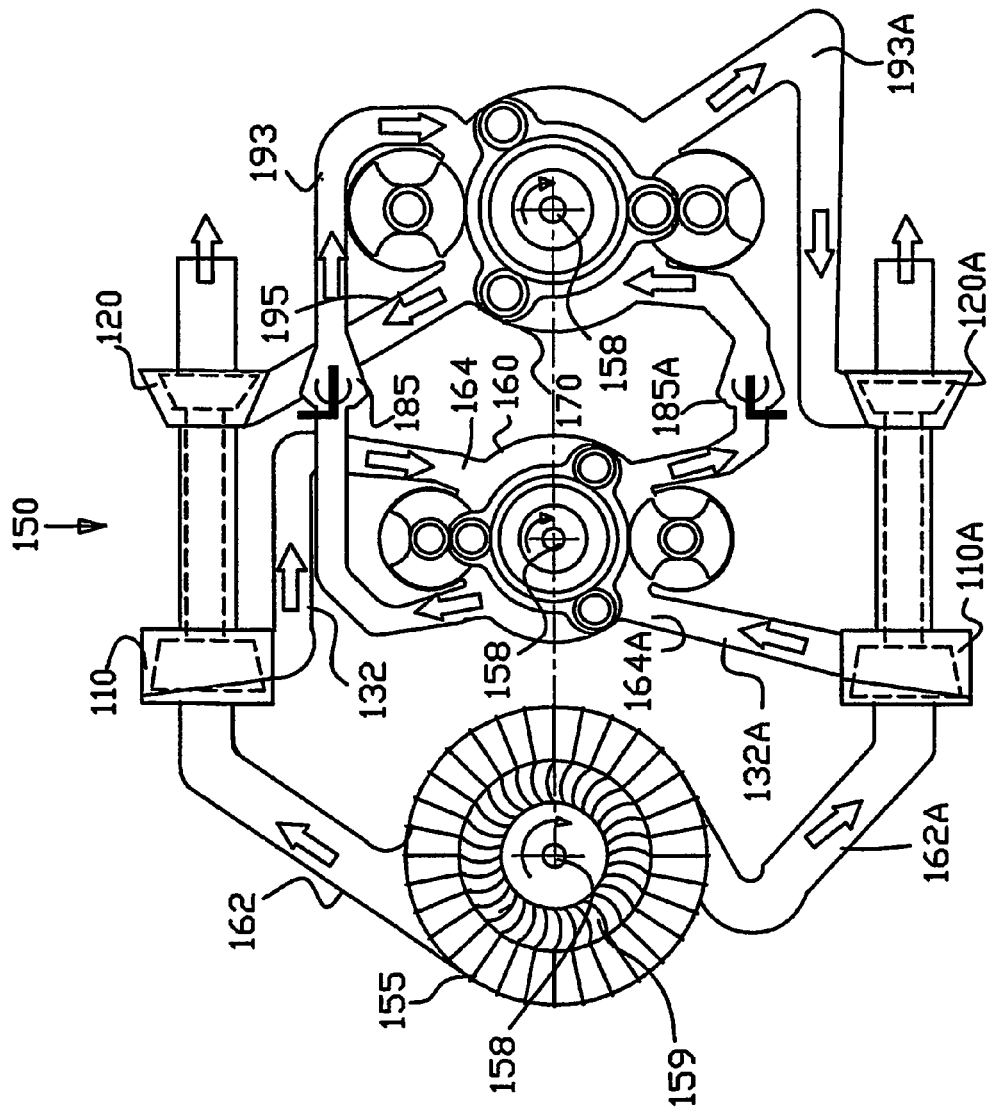

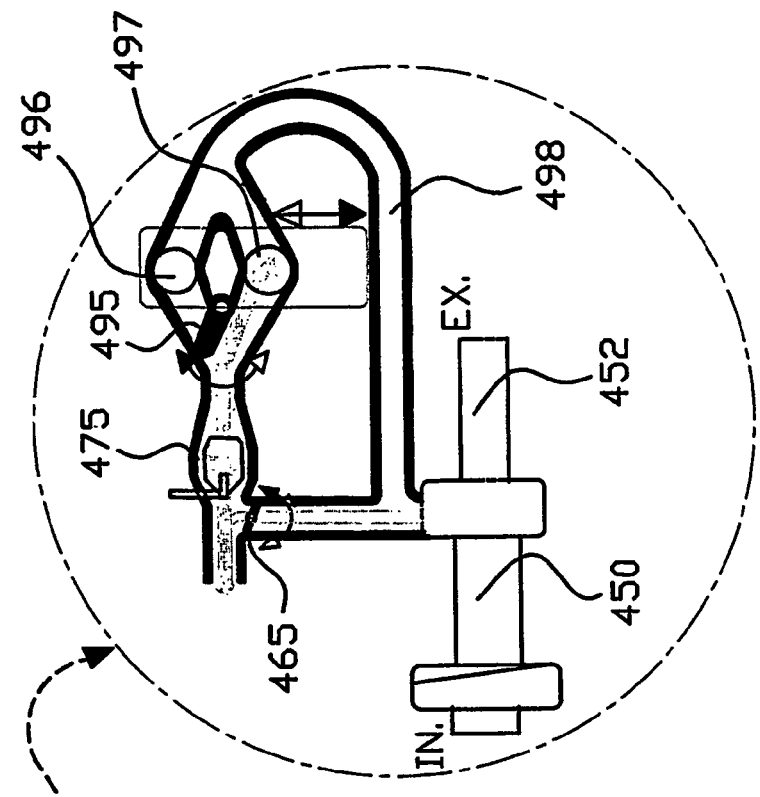
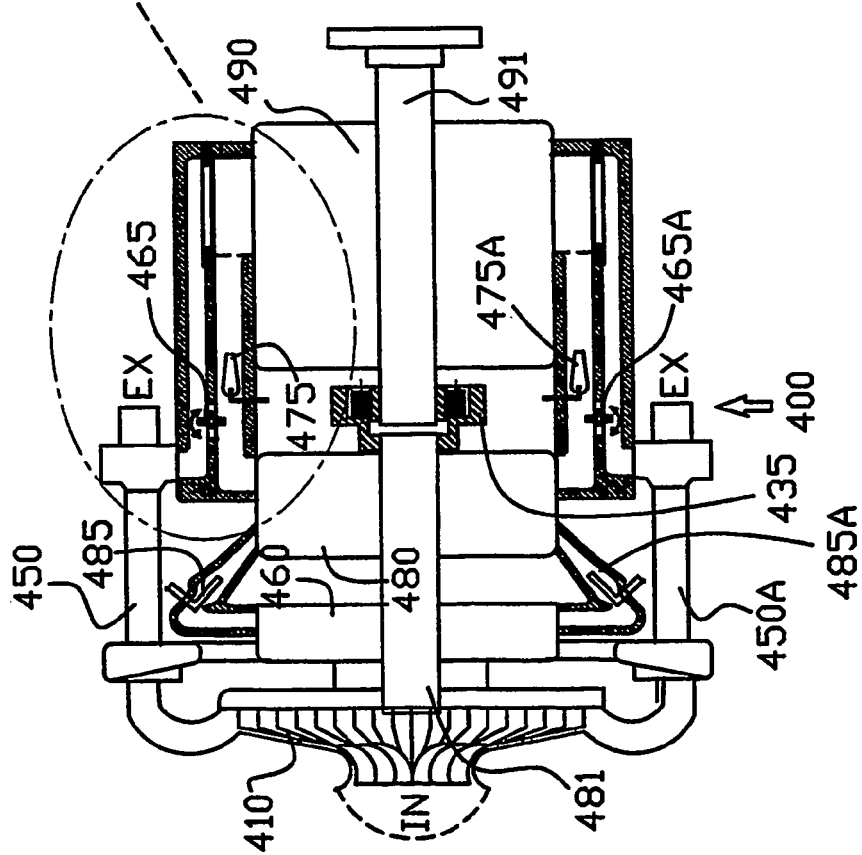
Fig. 10C
Fig. 10B

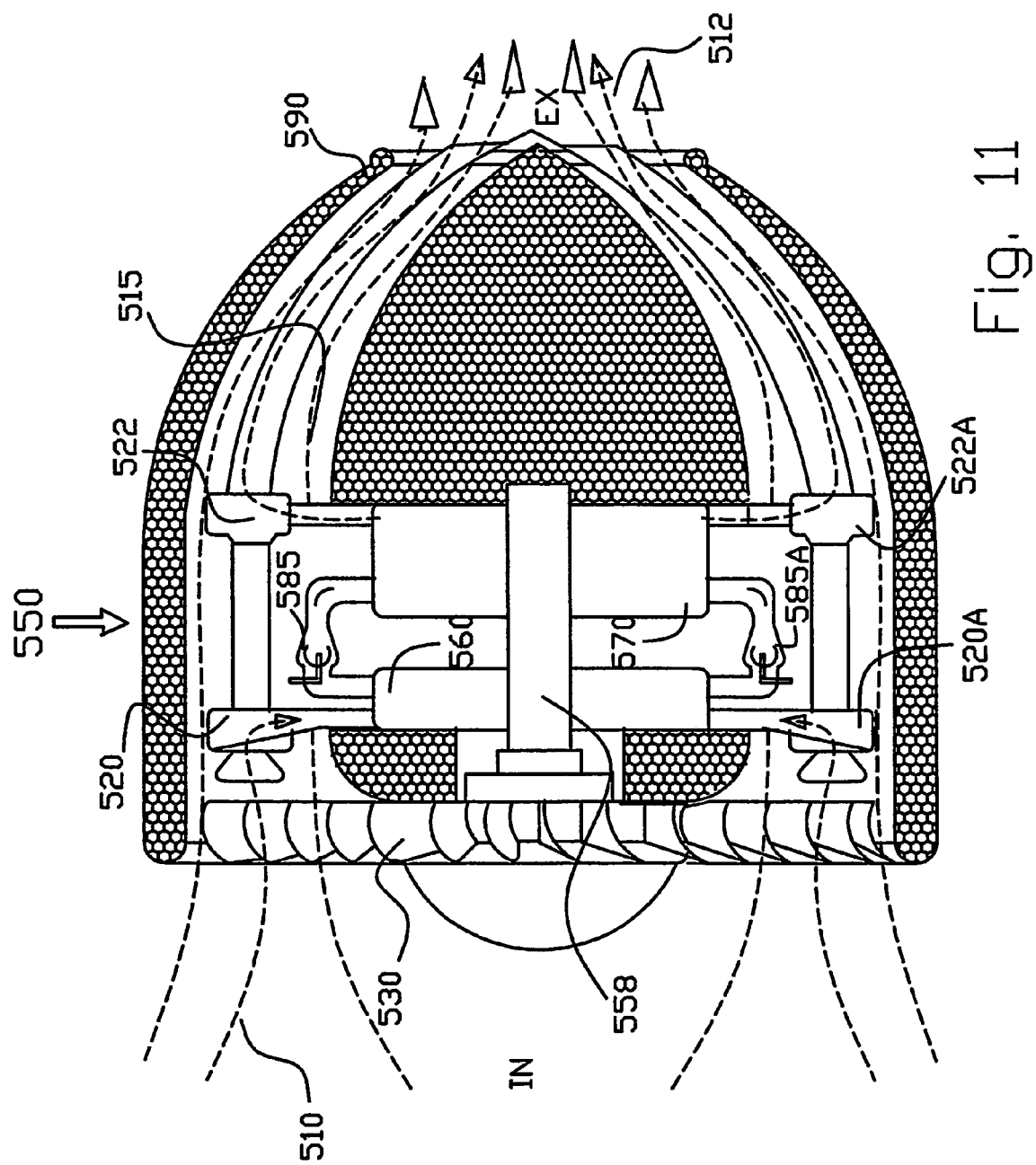

GAS TURBINE ENGINE SYSTEM

FIELD OF THE INVENTION

The present invention relates to the field of thermal engine systems, particularly gas turbines. More particularly the invention relates to a gas turbine in which a controlled volume of fluid undergoes a continuous-flow positive displacement cycle. A different system, but of the same type, is described and claimed in copending International Publication No. WO 03/076779, filed Mar. 10, 2003 by the same applicant hereof.

BACKGROUND OF THE INVENTION

The vast majority of world-wide prime mover capacity is in the form of internal combustion engines. These include engines in automobiles, trucks, tractors, ships, airplanes, and stationary plants. Thermodynamically, engines are classified according to their basic cycle.

A volumetric internal combustion engine possesses an advantage over a conventional gas turbine engine in that it operates by means of static pressure within a closed volume which enables effective and efficient operation with low dependence on engine velocity and therefore relatively high efficiency and output through a wide range of engine velocity. Also its parts can generally work at temperatures much less than the maximum cyclic temperature. As a result, said maximum cyclic temperature may be high, thereby allowing for a high cyclic efficiency. Other advantages associated with the volumetric internal combustion engine include its relatively low cost, high mechanical efficiency and wide variation in speed and load. These advantages are of particular importance in the field of land transportation.

A typical single-shaft open-type gas turbine engine designated by numeral 10 is illustrated in FIG. 1. Gas turbine engine 10 comprises compressor 2, combustor 6 and turbine 7, which is coupled to the compressor by shaft 8. Atmospheric air 3 enters compressor 2, in which its pressure and temperature is increased. The compressed air is then forced into combustor 5, in which it mixes and burns with a fuel. Hot pressurized combustion gases 9 expand within turbine 7 and achieve a higher velocity, causing shaft 8 to rotate, thereby driving compressor 2 and any load connected to the shaft, due to the kinetic energy of the combustion gas stream. Combustion gases 9 are then discharged to the atmosphere. The net work of the cycle is the difference between the work obtainable in the expansion process and the work of compression.

Relative to a volumetric engine, a gas turbine engine has a greater power to weight ratio, and therefore its size is smaller than its volumetric engine counterpart at a given power output. A gas turbine engine is capable of rapid start-up and loading, and is likely to have a long life. Also, an open-type gas turbine engine offers the advantage of simple sealing systems. No effective cooling is possible.

A gas turbine engine has good efficiency at full load when the operation temperature and kinetic energy of the combustion gases, compressor pressure ratio, and rotational velocity of the shaft are high. However, the efficiency is reduced when the load is lowered, such as by lowering the operation temperature or the rotational velocity of the shaft. Consequently, prior art gas turbine engines have been usually found to be suitable for those applications requiring substantially constant rotational velocity and output, such as transcontinental aircraft or power plants, but heretofore have been found not to be suitable for uses such as land transportation or light aircraft, which require wide variations in speed and load.

As previously mentioned, the performance of a gas turbine engine is directly related to the temperature of the combustion gases. Various types of combustors in which combustion is completed have been employed to maximize the temperature of the combustion gases, while the temperature that turbine components can withstand is generally the limiting factor concerning the upper limit of the combustion gas temperature. The complexity and cost of combustors has therefore increased, particularly due to the need to provide relatively cool air such that it is mixed with the hotter flame and/or combustion gases produced within the corresponding combustor, for preventing damage to the associated turbine components. The mixing process ends needs to be completed prior to the introduction into the turbine. A gas turbine engine system which employs a less complex combustor would therefore be desirable.

It is an object of the present invention to provide a combustion engine system, particularly a gas turbine engine, that allows for a wide variation in speed and load.

It is an additional object of the present invention to provide a gas turbine engine that is suitable for use in land transportation.

It is an additional advantage of the present invention to provide a combustion engine system that can efficiently burn a broad range of fuels.

It is another object of the present invention to provide a combustion engine system that is cost effective.

It is a further object of the present invention to provide a gas turbine engine that overcomes the disadvantages of the prior art devices while retaining their inherent advantages.

It is a still further object of the present invention to combine the advantages of volumetric systems with those of flow systems.

It is yet an additional object of the present invention to provide an engine system by which combustion may be completed externally to the combustors, thereby reducing combustor complexity.

Other objects and advantages of the invention will become apparent as the description proceeds.

SUMMARY OF THE INVENTION

The present invention will be better understood by referring first to the description of the aforesaid copending WO 03/076779, many elements of which apply, mutatis mutandis, also to the system of the present invention, as will be pointed out and explained in detail hereinafter. WO 03/076779 provides an improved combustion engine system comprising a first and at least one second volumetric device, through which work is performed during continuous flow of a compressible fluid from said first to said at least one second volumetric device.

The improvement of the present invention is that a transmission means is in engagement with two adjacent volumetric devices, said transmission means having a ratio designed to cause said at least one second volumetric device to rotate at a higher angular velocity than said first volumetric device, whereby to induce expansion of a compressible fluid during continuous flow from said first volumetric device to said at least one second volumetric device and to perform work.

Exemplary transmission means engaging the volumetric units include the sprocket wheel and a chain type, the planetary type, the toothed wheel type, the toothed belt and wheel type, and the continuous, variable speed type.

A plurality of volumetric units may be of equal and/or different volumes, and may be serially engaged to one another or assembled in side by side order by means of a transmission with a corresponding ratio. As referred to herein, "side by side order" means that the corresponding shafts of each volumetric device are substantially mutually parallel.

According to a preferred embodiment, the engine comprises an additional work producing device, particularly a turbine, driven by the fluid discharged from a second volumetric device.

As referred to herein, a "fluid displacement cycle" is defined as a process by which a fluid is displaced in a succession of stages, which may be repeated as many times as desired, theoretically for an unlimited number of times. If the displacement of the fluid in each stage is determined by the displacement or displacements of a mechanical element or a number of such elements from a first to a second position, the cycle is called a "positive displacement cycle".

As referred to herein, a "volumetric device" is a device that delivers the same volume of fluid that it receives. Generally, such a device uses a positive displacement cycle to transfer the same amount of fluid at each cycle. It should be understood that this need not be and generally is not the sole function of a volumetric device, but rather one of its functions. Typically, the same volume of fluid is received and delivered by the device in each stage. Said volume of fluid will be called hereinafter "controlled volume".

The transfer of a fluid from a first volumetric device to a second volumetric device, wherein fluid is transferred during each stage of the positive displacement cycle of the volumetric devices, is considered herein to be and is called "continuous flow".

A "turbine" is defined herein as a device for outputting work or for turbocharging fluid by transferring kinetic energy of a driving fluid into mechanical energy upon passage thereof across turbine blades. In embodiments of this invention comprising turbines, the driving fluid is the exhaust of the second of two volumetric devices.

In one preferred embodiment, the invention of WO 03/076779 provides an engine system which comprises:
a) one or more separate flow paths for a compressible fluid, each flow path beginning with a separate intake conduit leading to the first volumetric device and ending with a separate discharge conduit coming from the outlet of the at least one second volumetric device, each separate flow path being provided with a heat source disposed between the first volumetric device and a second volumetric device such that said second volumetric device receives heated controlled volumes of said fluid from the corresponding heat source via the corresponding separate flow path;
b) means for feeding the compressible fluid to the first volumetric device via a corresponding separate flow path;
c) means for driving the first volumetric device for sequentially transferring controlled volumes of said fluid to the corresponding heat source by positive displacement cycles;
d) means for driving the at least one second volumetric device for sequentially discharging said heated controlled volumes of said fluid by positive displacement cycles; and
e) means for synchronizing said means for driving said first and at least one second volumetric devices In preferred embodiments:
I) the means for synchronizing said means for driving said first and second volumetric device comprise a common shaft supporting said first and second volumetric devices for rotation.
II) the means for feeding a compressible fluid to a first volumetric transfer unit include means for increasing the pressure of said fluid, preferably a compressor;
III) the engine system further comprises a turbine and the discharge of said second volumetric device is the inlet of said turbine;
IV) the heat sources are combustors fed with a fuel, which receive controlled volumes of fluid and cause said fuel to burn, thereby heating said fluid, wherein said fuel may but need not be any fossil-based engine fuel;
V) the compressor, if any, the first and second volumetric device, and the turbine, if any, are keyed to the same main shaft;
VI) the compressible fluid is usually air;
VII) the engine system further comprises an additional work producing device, which is preferably but not necessarily a turbine, which device is driven by the fluid discharged from said second volumetric device and produces work from the kinetic energy of said discharged fluid.

Since said first volumetric device transfers fluid to said second volumetric device, it may be called "transfer volumetric device". Since said second volumetric device receives heated controlled volumes of fluid from the heat source or sources, it may be called "expansion volumetric device". A torque is exerted on said common shaft means or said main shaft of said engine system, due to a static pressure between said transfer and said expansion volumetric device chambers, independent on the torque exerted by the gas turbine or other additional work producing device, if any.

"Energy" denotes herein the net work done by the compressible fluid within the engine system while flowing to the discharge of said second volumetric device.

The positive displacement cycle is effected by means of apparatus selected from the group of rotors provided with lobes, Wankel mechanism, reciprocating piston systems, or any other common or specially designed volumetric system.

In a particular embodiment of the invention of WO 03/076779, the engine system further comprises at least one stage of intercoolers.

In another embodiment, the engine system comprises two independent shafts to one of which are keyed pressure generating volumetric devices, a load being coupled to the other shaft to which is keyed at least one output work generating expansion volumetric device, and optionally a one-way clutch for engaging and disengaging two independent shafts, depending on a magnitude of the load.

The engine system of the invention is suitable for operation at a variable load and speed. Therefore the engine system may be incorporated into a propulsion system. In one embodiment, the propulsion system comprises a third volumetric device rotating about an independent shaft, wherein the discharge from a second volumetric device is the working fluid of said third volumetric device, said third volumetric device being adapted to be a speed and torque converter in response to a variable load coupled to said independent shaft, the engine system further comprising a rotational direction controller of said independent shaft by a valve means which directs said discharge from the second volumetric device alternatively between the inlet and outlet ports of said third volumetric device. If necessary, a bypass valve that serves as engage and disengage device between an engine assembly and torque converter assembly is installed so that torque converter can be repressed while the engine is in operation.

The propulsion system may further comprise a first stage intercooler for cooling the discharge flowing from a first compressor to a second compressor and a second stage intercooler for cooling the discharge flowing from the second compressor to the turbocompressors of the turbochargers. It may further comprise a third stage intercooler for cooling the discharge flowing from the turbocompressor of the turbocharger to the first volumetric device, and a heat exchanger for heating the fluid flowing from the first volumetric device to the heat source by means of the discharge from the turbine of the turbocharger.

The propulsion system preferably further comprises a transmission comprising:

a) a plurality of coaxial volumetric devices rotatable about the independent shaft;
b) a plurality of conduits through which the discharge from a second volumetric device heater flows in parallel to each of said plurality of volumetric devices, respectively;
c) a plurality of selector valves provided with each of said plurality of volumetric devices, respectively, for changing the directional direction of the independent shaft by directing the flow through a corresponding conduit alternatively between the inlet port and outlet port of the corresponding volumetric device upon actuation of each of said selector valves in unison; and
d) a plurality of bypass valves in communication with each of said conduits, respectively, for selecting through which combination of said plurality of volumetric devices discharge from a second volumetric device will flow, wherein said propulsion system produces a maximum amount of torque when the discharge from a second volumetric device is directed to all of said plurality of volumetric devices in parallel, a lowered level of torque upon deactivation of at least one of said bypass valves, and an increased level of torque upon activation of at least one more of said deactivated bypass valves.

Preferably the plurality of selector valves are automatically actuated upon input of an operator or speed and torque controller.

In one aspect, the propulsion system further comprises a secondary combustor for heating the discharge from a second volumetric device, wherein the discharge from said secondary combustor is the working fluid of said third volumetric device.

In one aspect, the discharge from the secondary combustor flows in parallel to each of the plurality of volumetric devices, respectively, the plurality of selector valves selects through which combination of the plurality of volumetric devices discharge from the secondary combustor will flow, and a maximum amount of torque is produced when the discharge from the secondary combustor is directed to all of the plurality of volumetric devices in parallel.

In another preferred embodiment, the engine system is a turbofan engine system which further comprises a turbocompressor for compressing atmospheric air and delivering said compressed air to a transfer volumetric device and a turbine driven by discharge from an expansion volumetric device for driving said turbocompressor, wherein the main shaft drives a fan which generates a crossfan streamline and a main thrust for an aircraft, exhaust from said turbine being discharged to the atmosphere and providing auxiliary thrust which is in addition to said main thrust. A similar embodiment can be realized without a turbocompressor by using the fan thrust also for the feeding of the volumetric device.

In another preferred embodiment of the invention, the engine system is a turbojet engine system, wherein the expansion volumetric device provides auxiliary thrust which is in addition to the main thrust for an aircraft provided by a jet stream generated by a main burner, an air stream from said at least one compressor feeding the inlet volumetric chamber and the main burner. A similar embodiment can use turbo compressor(s) in order to improve efficiency and output.

The heat supply of the engine system of the invention may be optionally supplied from an external source. Additionally, a closed type of work process may be used in the engine system of the invention.

By employing one of the aforementioned embodiments, combustion need not be completed within a combustor, but rather may be completed within a second volumetric device. Accordingly, the temperature of combustion gases may advantageously be higher than that which is achieved in the prior art while combustors of a relatively simply configuration may be employed.

BRIEF DESCRIPTION OF THE DRAWINGS

In the drawings:

FIGS. 1-12 show the invention described and claimed in WO 03/076779, but will also serve to understand various aspects of the present invention.

FIG. 1 is a schematic drawing of a prior art gas turbine system;

FIG. 2 is a schematic drawing of a volumetric system comprised of two unequally sized chambers;

FIG. 3 is a flow diagram of an engine system which does not drive a compressor or a turbine;

FIG. 4 is a flow diagram of an engine system which does not drive a turbine;

FIG. 5 is a flow diagram of an engine system according to the invention.

FIGS. 6A and 6B are schematic and flow diagrams, respectively, of an engine system which incorporates a turbocompressor, showing the operation of a rotary lobe positive displacement cycle;

FIG. 7 is a flow diagram of an engine system which incorporates a turbocompressor, showing the operation of a Wankel-based positive displacement system;

FIG. 8 is a flow diagram of an engine system which incorporates a turbocompressor, showing the operation of a reciprocating piston positive displacement system;

FIG. 9 is a flow diagram of an engine system which incorporates intercoolers and heat exchangers;

FIGS. 10A and 10B are flow and schematic diagrams, respectively, of an engine system suitable for motor vehicles, while FIG. 10C illustrates the operation of a selector valve and declutching (bypass) valve;

FIG. 11 is a schematic drawing of an engine system suitable for a turbofan;

FIG. 12 is a schematic drawing of an engine system suitable for a turbojet;

DETAILED DESCRIPTION OF PREFERRED EMBODIMENTS

In one embodiment thereof, the present invention provides a novel gas turbine engine system in which the working fluid imparts a torque upstream to the turbine blades, so that a wide variation in load and shaft speed may be realized without a significant reduction in cyclical efficiency. Prior art gas turbine engines achieve a relatively high cyclical efficiency at full load when the kinetic energy of combustion gases flowing from a combustor to a turbine is at a maximum; however, their efficiency is significantly lowered following a reduction in kinetic energy of the combustion gases and a concomitant reduction in shaft speed. Use of prior art gas turbine engines is therefore precluded for those applications which require a wide variation in speed and load, such as land transportation or light aircraft. In contrast, the engine system of the present invention incorporates a positive displacement cycle by which a transfer volumetric device and an expansion volumetric device in fluid communication with one another by means of conduits and a combustor. A torque, exerted on the main engine shaft, is generated due to difference in size (and volume) between the two volumes and rotors under the same pressure. The energy of the working fluid is therefore utilized for various applications, as will be described hereinafter, which increases the cyclical efficiency of the engine system as well as its flexibility in terms of performing work during changes of speed and load.

Figure 1:
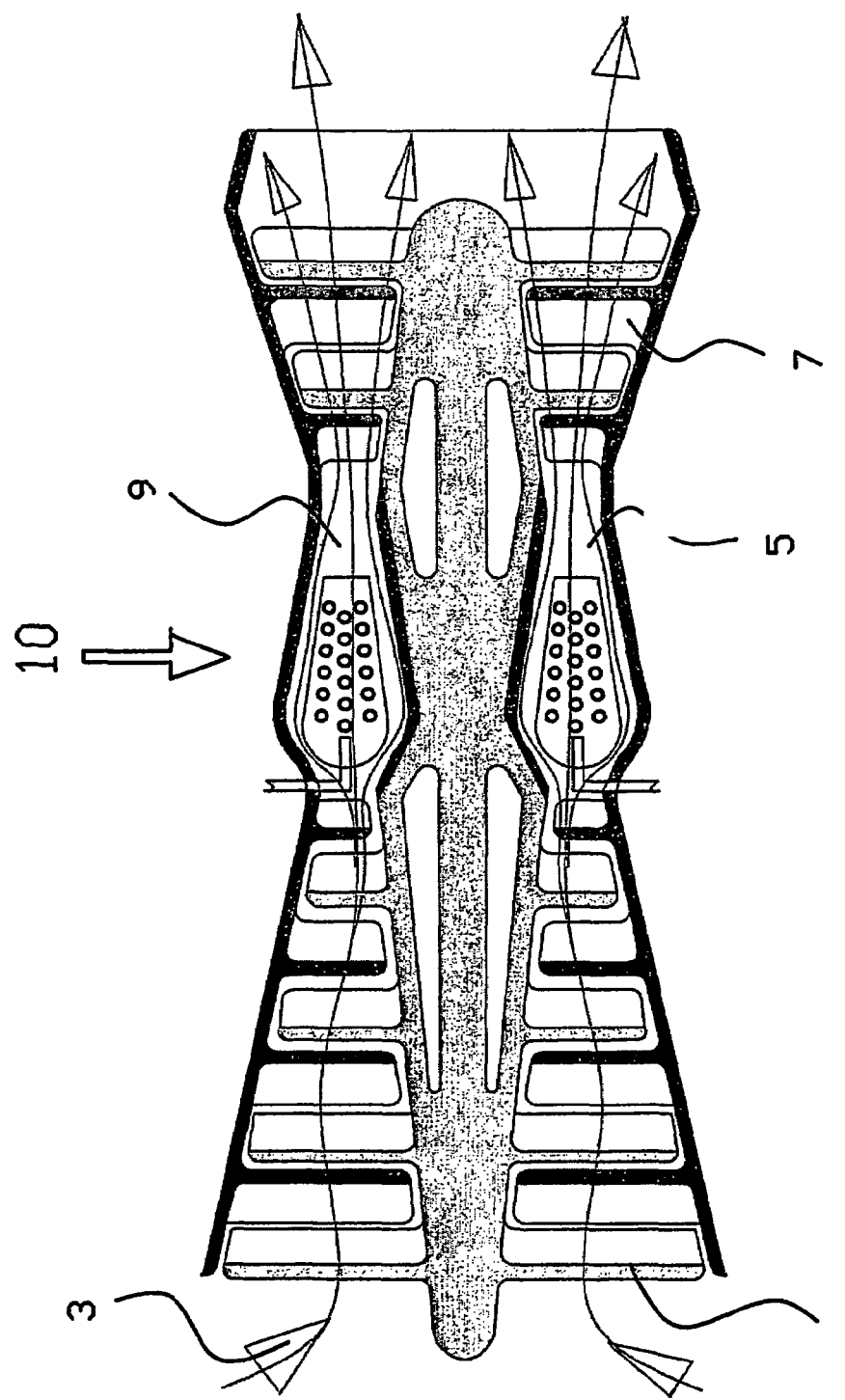
Figure 2A:
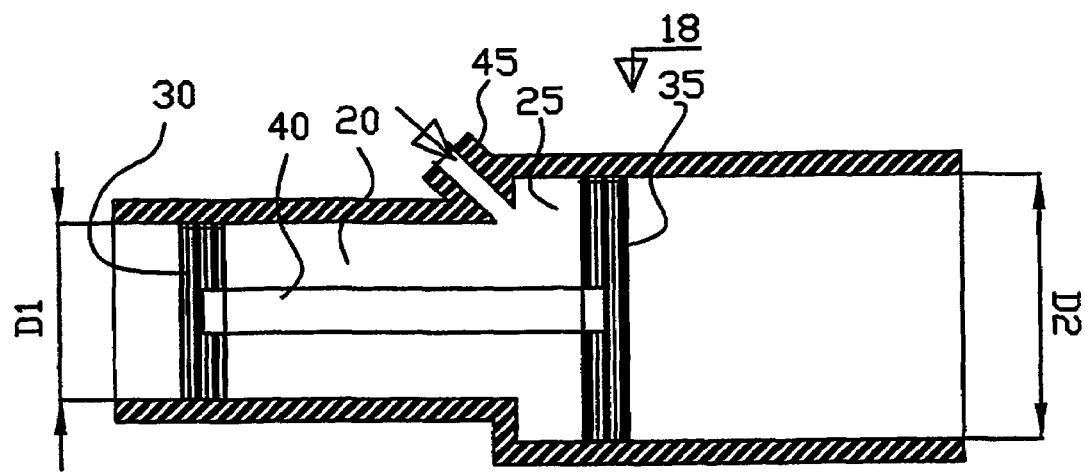
Figure 2B:
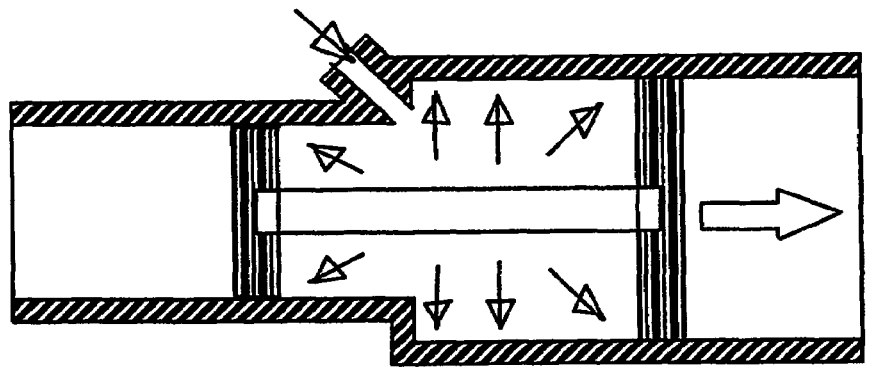
Figure 2C:
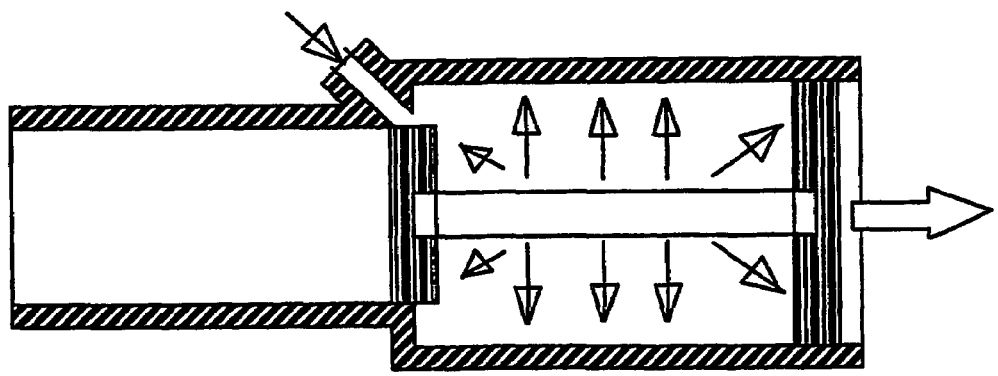

FIGS. 2A to 2C are a schematic illustration of a principle that is applied in the invention of WO 03/076779. FIG. 2A shows a volumetric system generally indicated as 18, which comprises two interconnected chambers 20 and 25 of unequal volume and of unequal diameters D1 and D2. Pistons 30 and 35 are displaceable within chambers 20 and 25, respectively, and are connected by rod 40 parallel to the longitudinal axis of system 18. The volume between the two pistons comprises two portions, each belonging to one of the two chambers. As the pistons move along the longitudinal axis of the system both portions vary. If a fluid is admitted to the system via inlet 45, a pressure is produced in each of said two chamber portions. Since piston 35 has a larger surface than piston 30, said pressure generates a resultant force (directed to the right as seen in the figures) on the assembly of the two pistons and rod 40, said assembly is displaced in said direction, and work can be obtained from said displacement. As more fluid is admitted through inlet 45, said assembly is additionally displaced, and more work may be obtained from volumetric system 18. FIGS. 2B and 2C show successive stages of said process.

All of the following embodiments are described as comprising two independent flow paths of working fluid. It will be understood that any number of flow paths may be employed with similar results, and two flow paths have been chosen to simplify the description.

Figure 3:
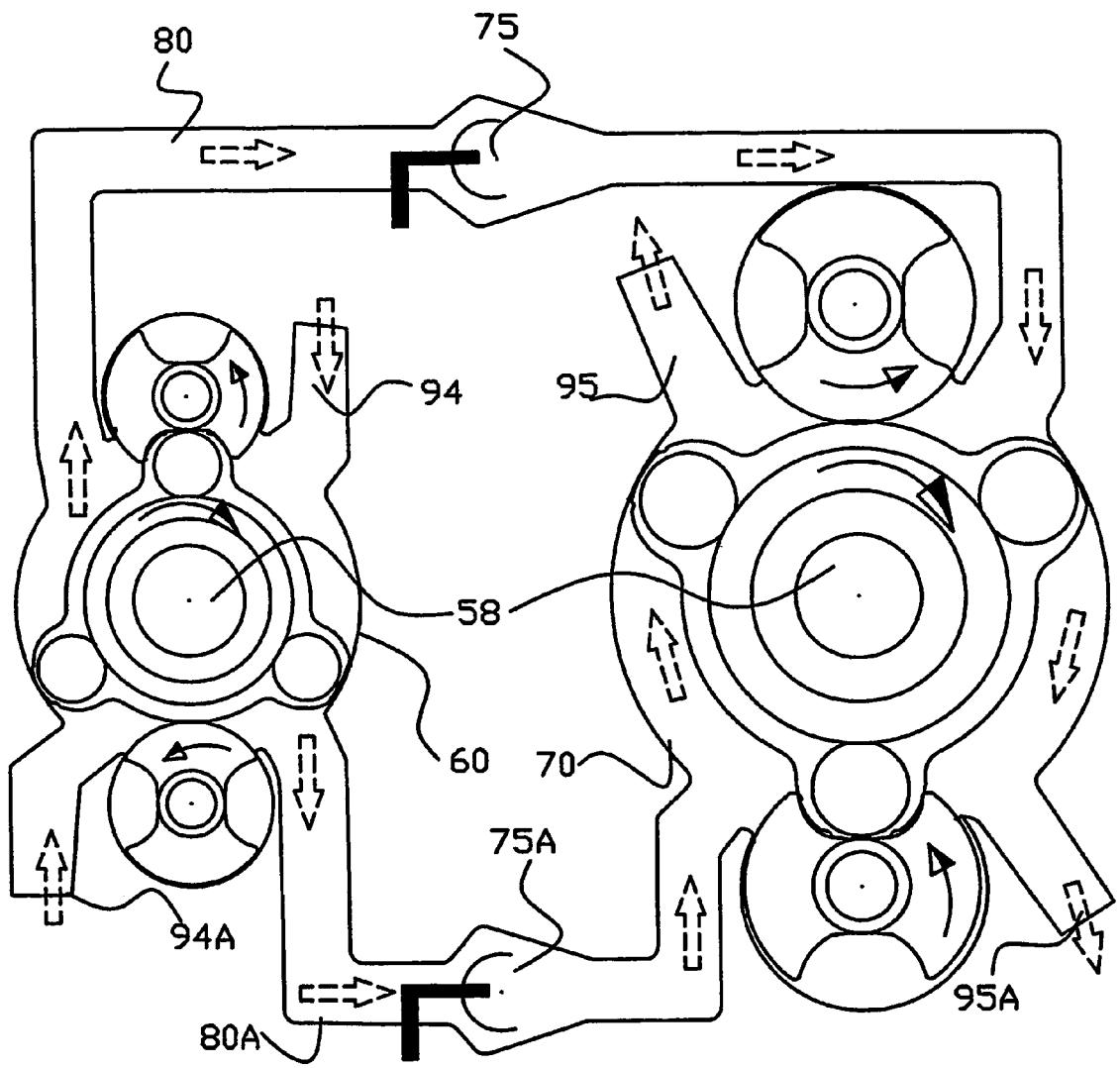

FIG. 3 demonstrates the very basic concept of the invention: a volumetric device consists of at least two volumetric units; transfer unit 60 and expansion unit 70 rotating about a common shaft 58. Said transfer unit 60 is charged through intake conduits 94 and 94A and then connected to said expansion unit via conduits 80 and 80A and combustors 75 and 75A. At the end of each expansion sector, the burnt mixture is discharged from expansion unit 70 through exhaust conduits 95 and 95A. Most of the forthcoming embodiments of the invention are based on the above described device (FIG. 3) or alike with different, corresponding peripheral systems.

Figure 4:
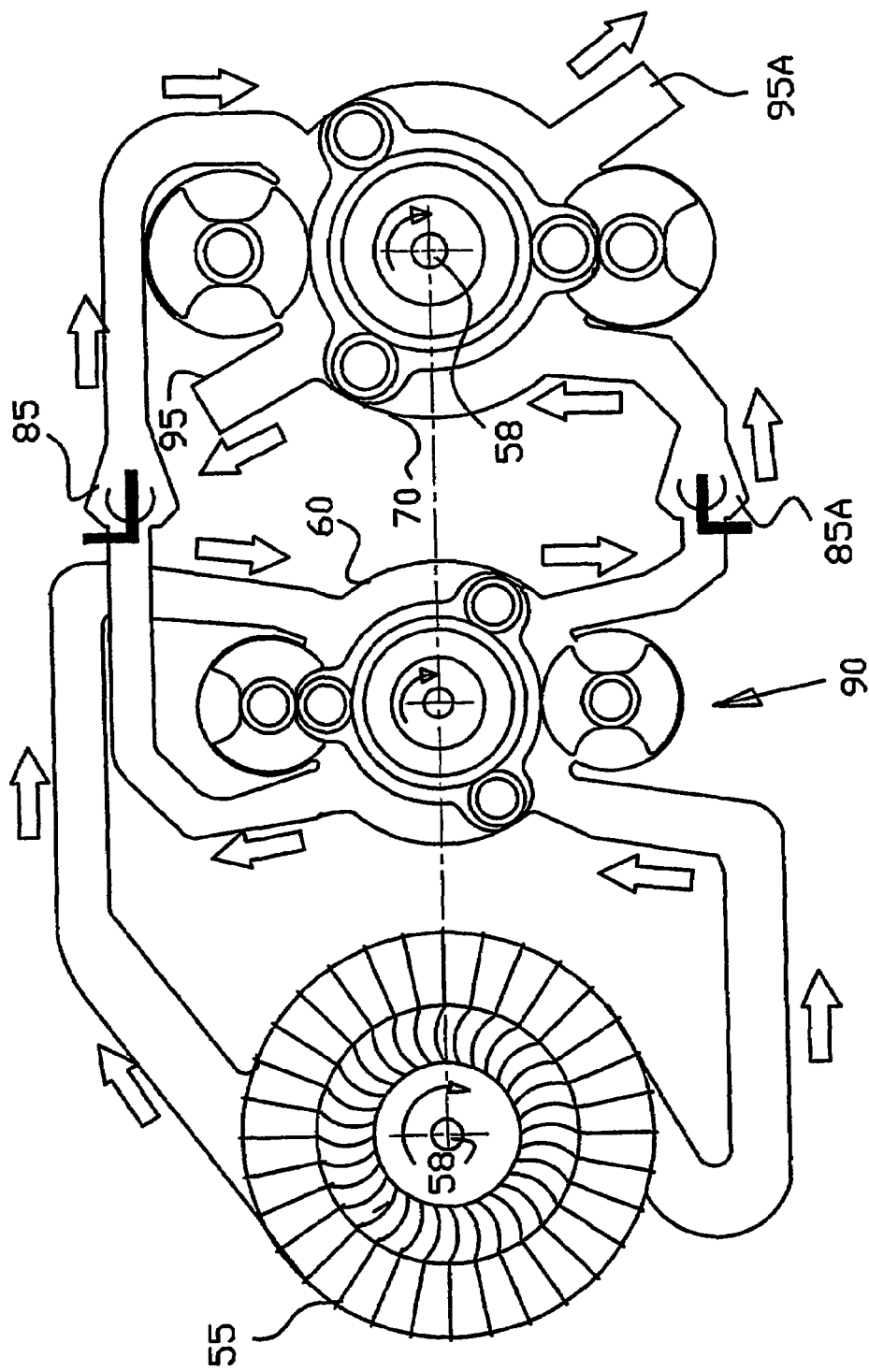

As shown in FIG. 4, an engine system 90 may be without a turbine, and the pressure of the fluid between transfer unit 60 and expansion unit 70 can be utilized for driving a load connected to shaft 58. Compressor 55 forces compressed working fluid into the system, whereby it is transferred to combustors 85 and 85A, heated in accordance with the present invention, and then discharged through exhaust ports 95 and 95A.

Figure 5:
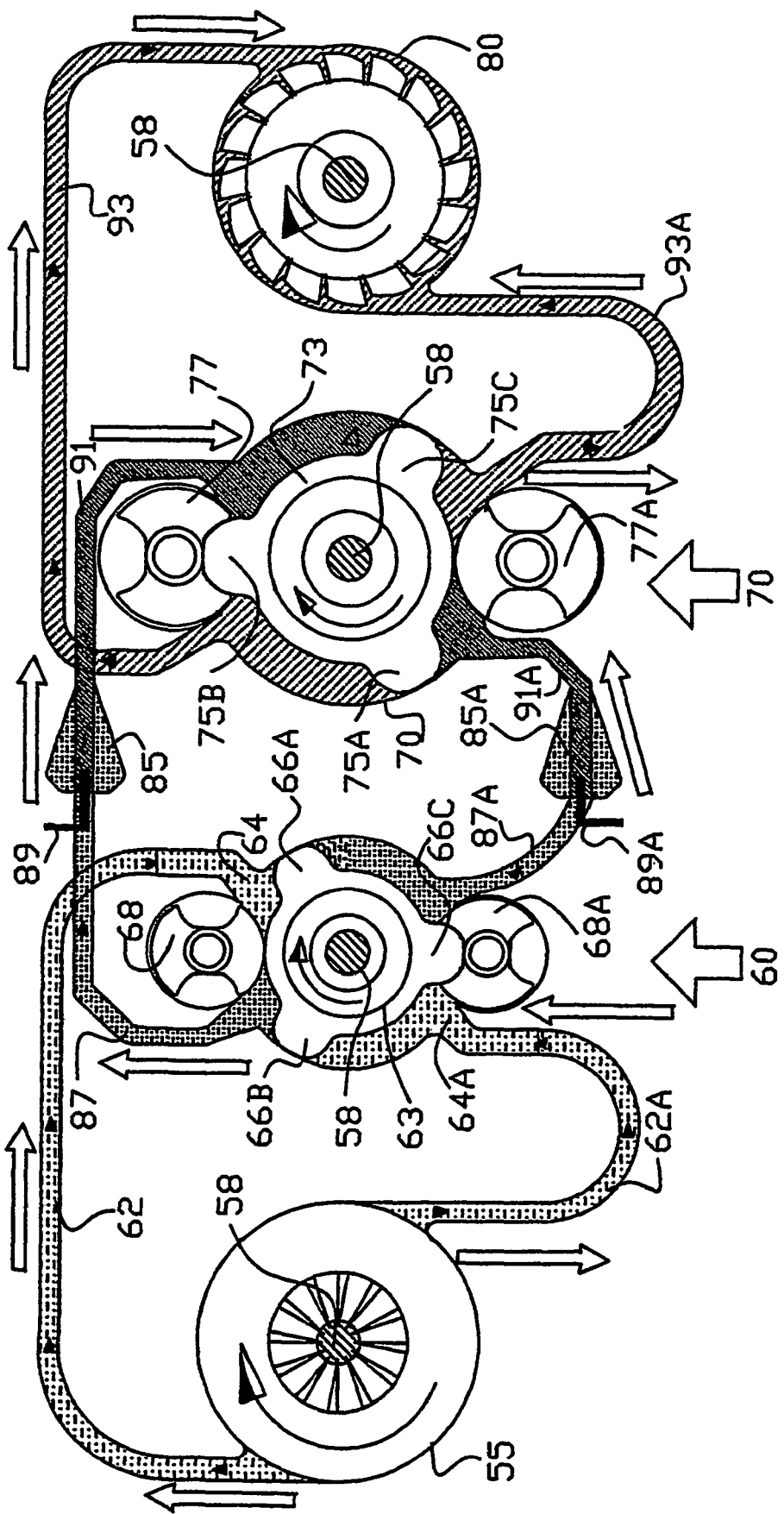
Figure 5A:
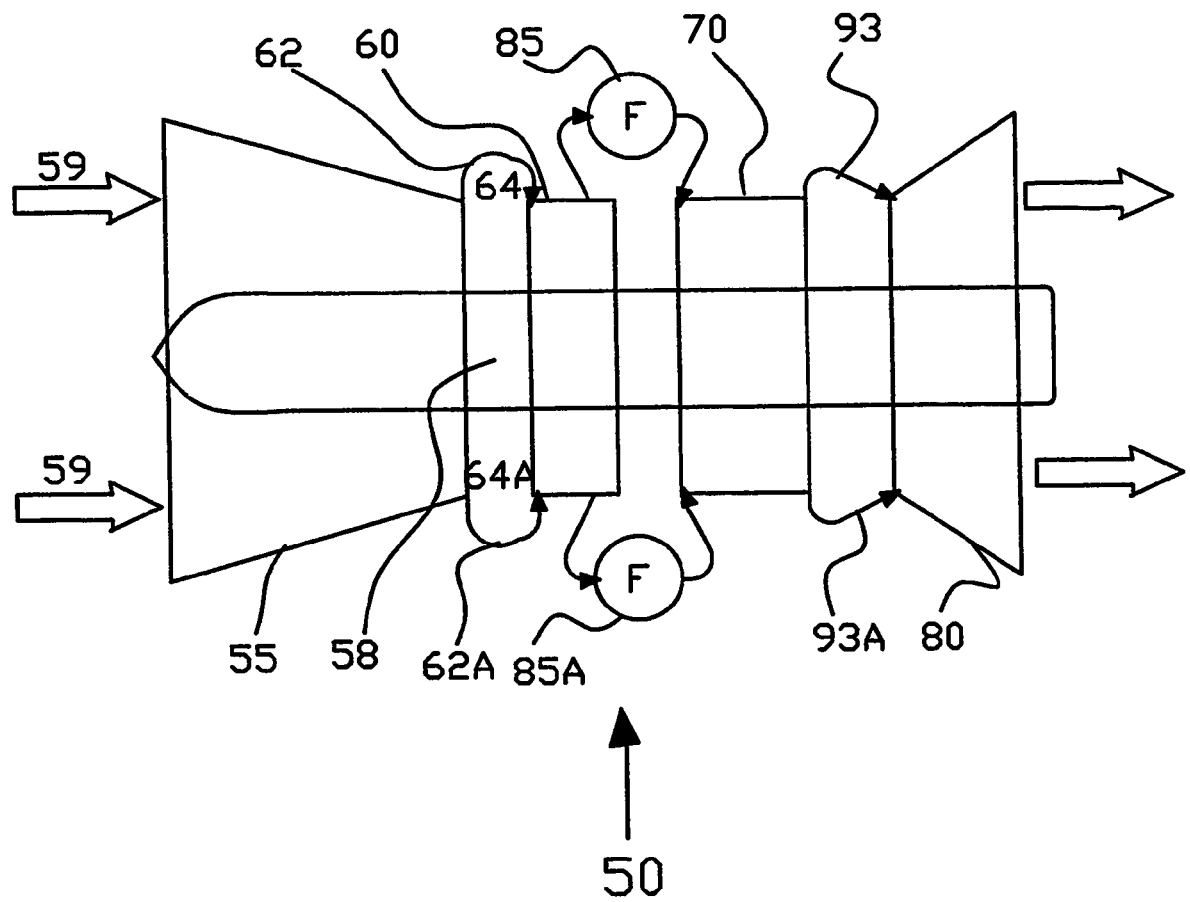
FIG. 5A is a schematic drawing of the system of FIG. 5.

FIGS. 5 and 5A schematically illustrate a gas turbine engine system based on a volumetric (rotary lobe herein) positive displacement cycle in accordance with the present invention. The system is indicated generally as 50. It comprises a compressor 55, a (first) transfer volumetric device 60, a (second) volumetric device 70, which is an expansion volumetric device, and a turbine 80, all of which devices rotate about a common shaft 58. In FIG. 5A the system is shown in schematic side view, while in FIG. 5 the said devices are shown in schematic cross-section as laterally displaced from one another while in fact they are aligned along a common longitudinal axis. Working fluid 59, after being compressed by compressor 55, flows through conduits 62 and 62A and is admitted to transfer volumetric device 60 via ports 64 and 64A, respectively.

In this embodiment transfer volumetric device 60 is provided with three lobes 66A-C. It will be appreciated that any number of lobes may be employed. In the position of said device shown in FIG. 5, an inlet chamber is defined between casing 63, lobe 66B and buffer 68A. During rotation lobe 66C is passing buffer 68A and then maximum volume of the chamber is defined between casing 63 and lobes 66B and 66C. On continuation of clockwise rotation lobe 66B is passing buffer 68 and said chamber become an outlet chamber while it's volume is diminishing between lobe 66C and buffer 68 urging the fluid into combustor 85 through conduit 87. The same process is taking place at the other half of the same device. The different in lobe area (and as a result, in volume) between the expansion volumetric device and the transfer volumetric device, when under pressure generates a moment about shaft 58 causing it to rotate (clockwise). As said shaft rotates, said inlet chambers are increased and said outlet chambers are reduced. The content of said outlet chambers is fed to combustors 85 and 85A. Said content has the volume that is referred herein as the "controlled volume". Concurrently and gradually through a rotation of shaft 58 by 180° (generally, a number of degrees equal to 360 divided by the number of buffers), in accordance with the description hereinabove, it is understood that every lobe that is passing through a buffer is forming a new inlet chamber behind it and defining an outlet chamber ahead of it.

Whenever an inlet chamber is connected by a feed conduit to the compressor and an outlet chamber is concurrently connected by a discharge conduit to a combustor, communication between the feed conduit and the discharge conduit must be prevented. This is obtained by providing rotary buffers 68 and 68A which have seats so shaped as to be engaged by any one of the lobes 66 to form a seal between conduits 62 and 87 and between conduits 62A and 87A, respectively. The combination of a buffer and a lobe, therefore, acts as a valve. Each rotary valve, together with the lobe that follows it in the direction of rotation of the volumetric transfer unit 60, demarcates a controlled volume of fluid through which work is obtainable in the engine system, and additionally urges said controlled volume to combustors 85 and 85A. In the condition shown in FIG. 5, rotary buffer 68A is engaged by lobe 66C. As device 60 continues to rotate in a clockwise direction, lobe 66A engages rotary buffer 68A. During this stage, compressed working fluid is discharged in bursts to combustors 85 and 85A via conduits 87 and 87A respectively, and another charge of working fluid is concurrently admitted to the transfer unit 60.

The combustors 85 and 85A comprise injectors 89 and 89A respectively. Fuel is injected into the compressed working fluid by means of injectors 89 and 89A, so that the resulting combustible mixture is ignited and burned in a steady state, thereby raising the pressure and temperature of the working fluid. The combustion gases constitute a heated working fluid. They are discharged to expansion volumetric device 70 via conduits 91 and 91A.

Figure 7:
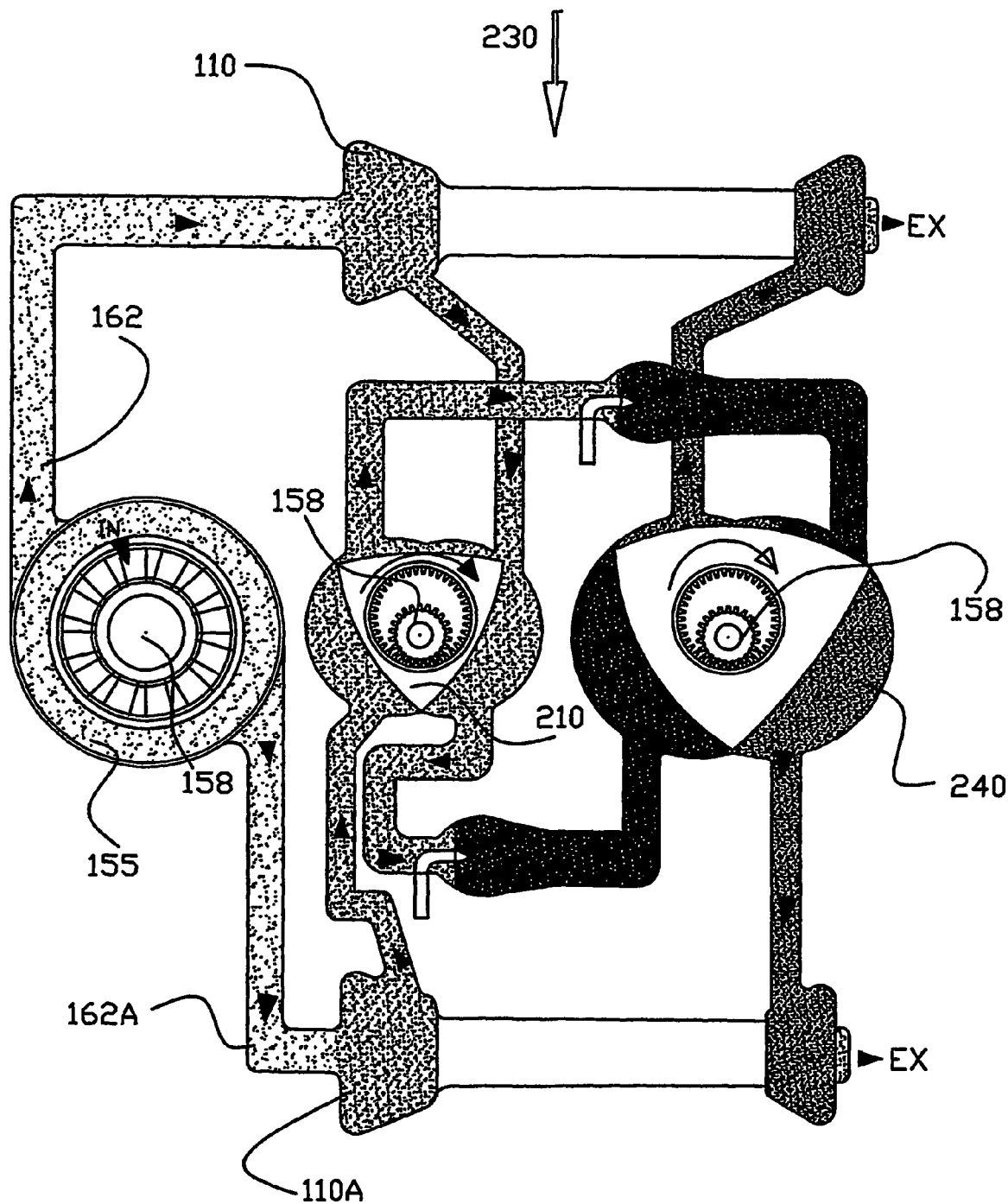

Expansion volumetric device 70 is structured like transfer volumetric device 60 except for its scale. It comprises a rotor with three lobes; 75A, 75B and 75C and rotary buffers; 77 and 77A. In the condition shown in FIG. 5, an expansion chamber is defined between buffer 77A and lobe 75A and an outlet chamber is defined between lobe 75A and buffer 77 in one sector of 180° of the expansion unit. A second expansion chamber is defined between buffer 77 and lobe 75C and an outlet chamber is defined between lobe 75C and buffer 77A in the other sector of 180° of the expansion unit. The third lobe 75B is crossing the rotary buffer 77 through a matching dent in order to perform the same operation as lobe 75A and lobe 75C in a sequence. In the structure shown in FIGS. 3, 4, 6B and 5, the volumetric device (transfer and expansion) is performing six complete cycles during each revolution of 360°. In the structure shown in FIG. 5D the volumetric device is performing twelve complete cycles during each revolution of 360°. In FIG. 7, a Wankel system volumetric device is performing six complete cycles of the rotors during each revolution of 360°, but the main shaft (which is directly connected to the compressor fan) is rotating three times faster.

Since the pressure during the expansion cycle is built up continually, the remaining pressure at the end of each expansion sector is relatively high. This pressure is conducted to turbine 80 via conduits 93 and 93A in order to use its kinetic energy in the turbine.

Figure 5B:
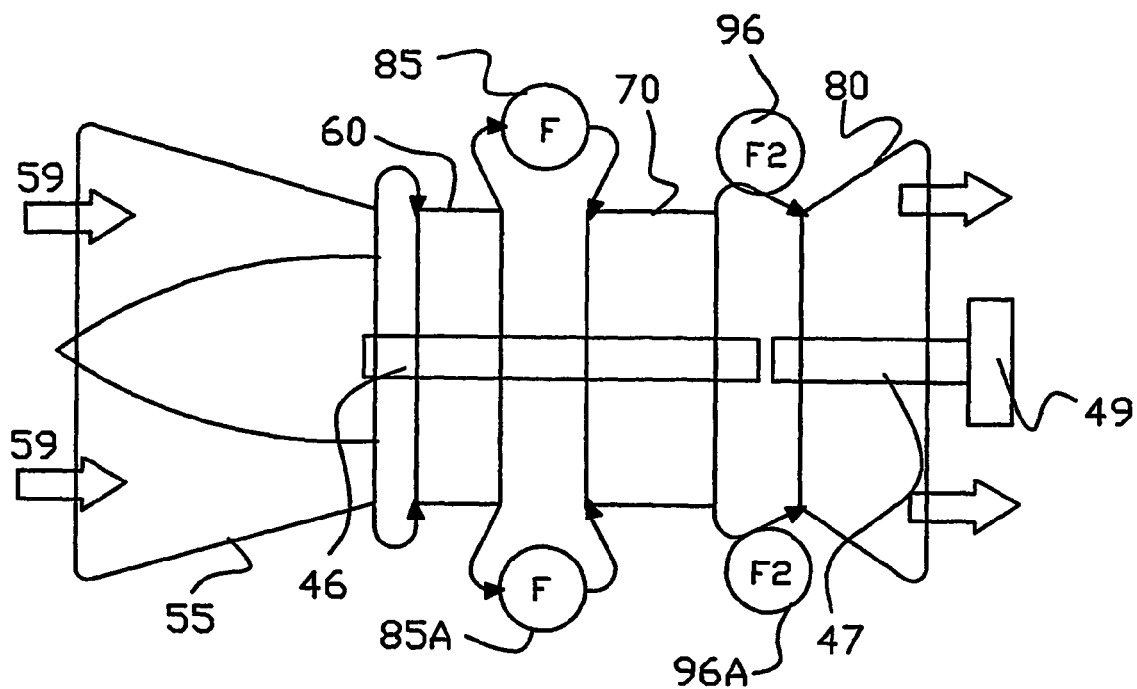
FIG. 5B is a schematic drawing of a similar engine system with the addition of secondary burners and a secondary shaft.

In FIG. 5B an engine configuration comprising two independent shafts is illustrated. Compressor 55 and volumetric devices 60 and 70 rotate about shaft 46, while turbine 80 rotates about shaft 47. As a result turbine 80 rotates at a speed independent of the speed of expansion volumetric device 70, according to an external load connected to coupling 49. Shaft 47 may drive for example a transmission system (not shown). Optionally, the exhaust from expansion unit 70 may be reheated by secondary combustors 96 and 96A before introduction to turbine 80 in order to increase the engine output. Alternatively, the exhaust from expansion unit 70 may be introduced directly to turbine 80 in order to increase the engine output. After expansion within expansion volumetric device 70, the burned combustion gases still contain a sufficient amount of oxygen to warrant the use of secondary combustors.

Figure 5C:
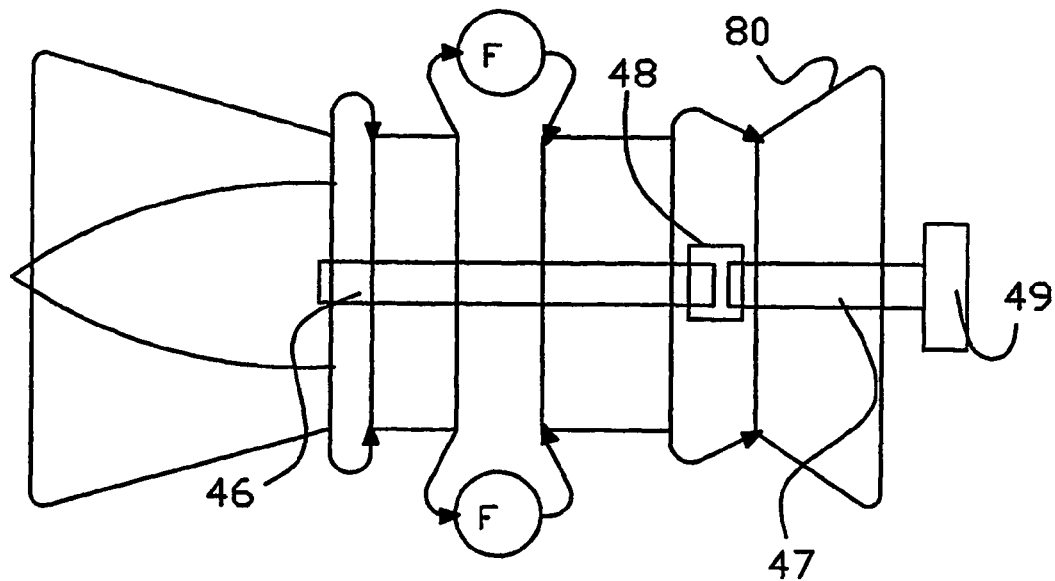
FIG. 5C illustrates the addition of a one-way clutch.

If so desired, one-way clutch 48 as illustrated in FIG. 5C may be used to further increase the flexibility of the engine configuration. When turbine 80 is under a heavy load at coupling 49 and the speed of shaft 47 is lowered to substantially that of shaft 46, one-way clutch 48 is engaged and the power performed by shaft 47 is added the power take of shaft 46. Upon reduction of the load connected to coupling 49, the speed of shaft 47 can increase to a value much higher than shaft 46 and one-way clutch 48 is disengaged from shaft 46, to allow the two shafts to rotate at different speeds.

Figure 5D:
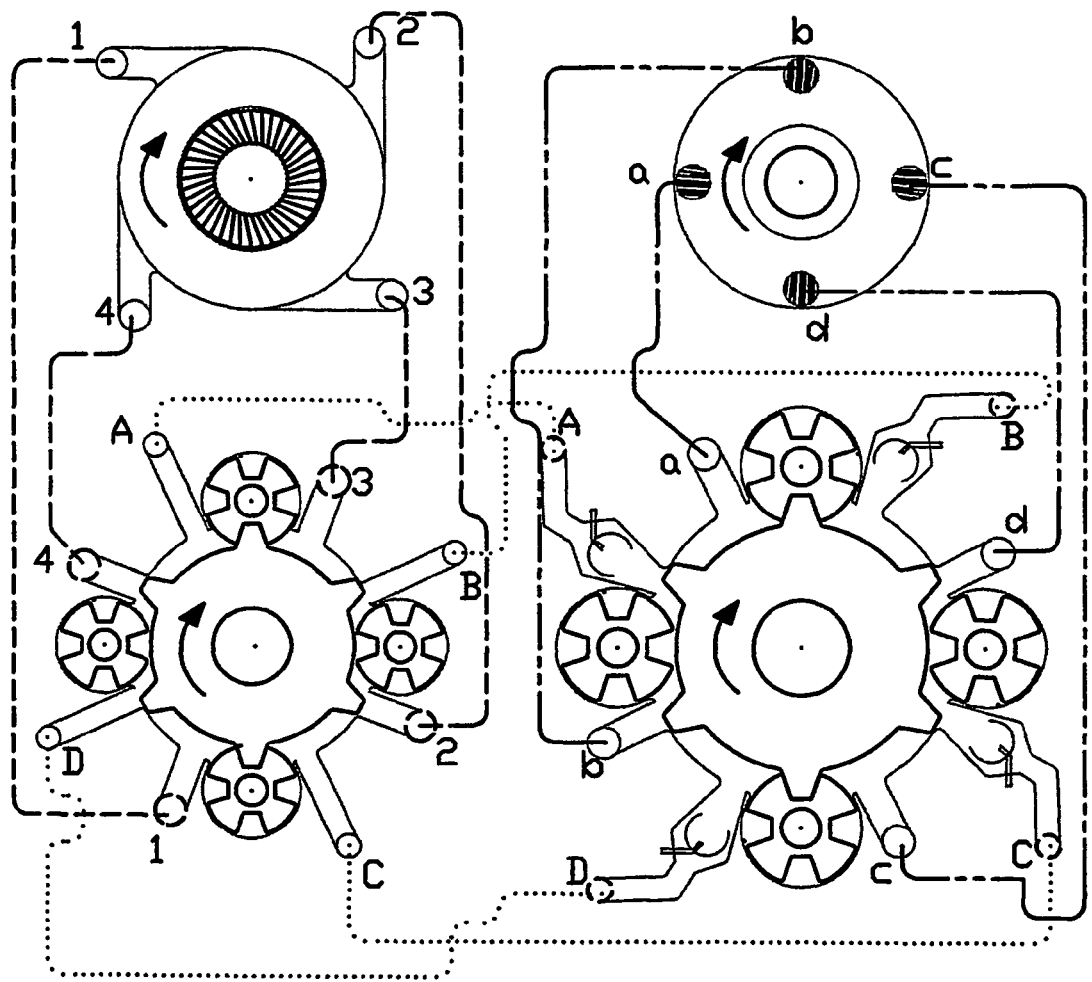
FIG. 5D demonstrates the capacity of constructing a volumetric system like that of FIG. 5 and other embodiments of the invented system, with multiple buffered sectors (four in FIG. 5D) in accordance with any specific design.

FIG. 5D schematically illustrates an engine system which differs from that illustrated in FIG. 5 only in that it comprises four, instead of two, buffered sectors in each volumetric device. FIG. 5D is therefore self-explanatory. It will be understood that different numbers of buffered sectors could be provided in such engine systems, and four sectors are known in FIG. 5D only by way of example.

Another preferred embodiment of the present invention comprising a turbocharged engine system generally indicated by 150 is illustrated in FIGS. 6A and 6B. Intake air 159 is compressed in two stages, by compressor 155 coaxial with volumetric transfer unit 160 and expansion volumetric unit 170 and by turbocompressors 110 and 110A fed with compressed air from compressor 155 through conduits 162 and 162A, respectively. Turbocharged air flows through conduits 132 and 132A and is admitted to transfer unit 160 at entry ports 164 and 164A, respectively, with such an increased pressure that more fuel may be burned in combustors 185 and 185A, respectively, and that engine system 150 may generate more power at shaft 158. The exhaust from expansion unit 170 flows through conduits 193 and 193A and provides the motive force, by means of the kinetic energy of the combustion gases discharged from expansion unit 170 to rotate turbines 120 and 120A. Turbines 120 and 120A in turn drive turbocompressors 110 and 110A, respectively.

The invention may be performed by means of other positive displacement devices. A system generally designated by 230 is illustrated in FIG. 7, in which the positive displacement cycle is based on a Wankel mechanism, in which a triangular rotor rotates on an eccentric shaft inside an epitrochoidal housing. Intake air is compressed in two stages, namely by compressor 155, which is coaxial with volumetric transfer unit 210 and with expansion volumetric unit 240, which (in the invention of WO 03/076779) has a larger inner volume than that of the first volumetric transfer unit 210, and by turbocompressors 110 and 110A whose inlet is compressed air flowing from compressor 155 through conduits 162 and 162A, respectively. As the triangular rotor of a volumetric unit rotates, each controlled volume of fluid which is sequentially admitted into the corresponding volumetric unit is captured by two adjacent apexes of the triangular rotors. Therefore transfer unit 210 can deliver turbocharged air to the combustors and expansion unit 240 allows for the expansion of combustion gases so that a desired amount of work is obtainable at common shaft 158, in accordance with the present invention.

Figure 8:
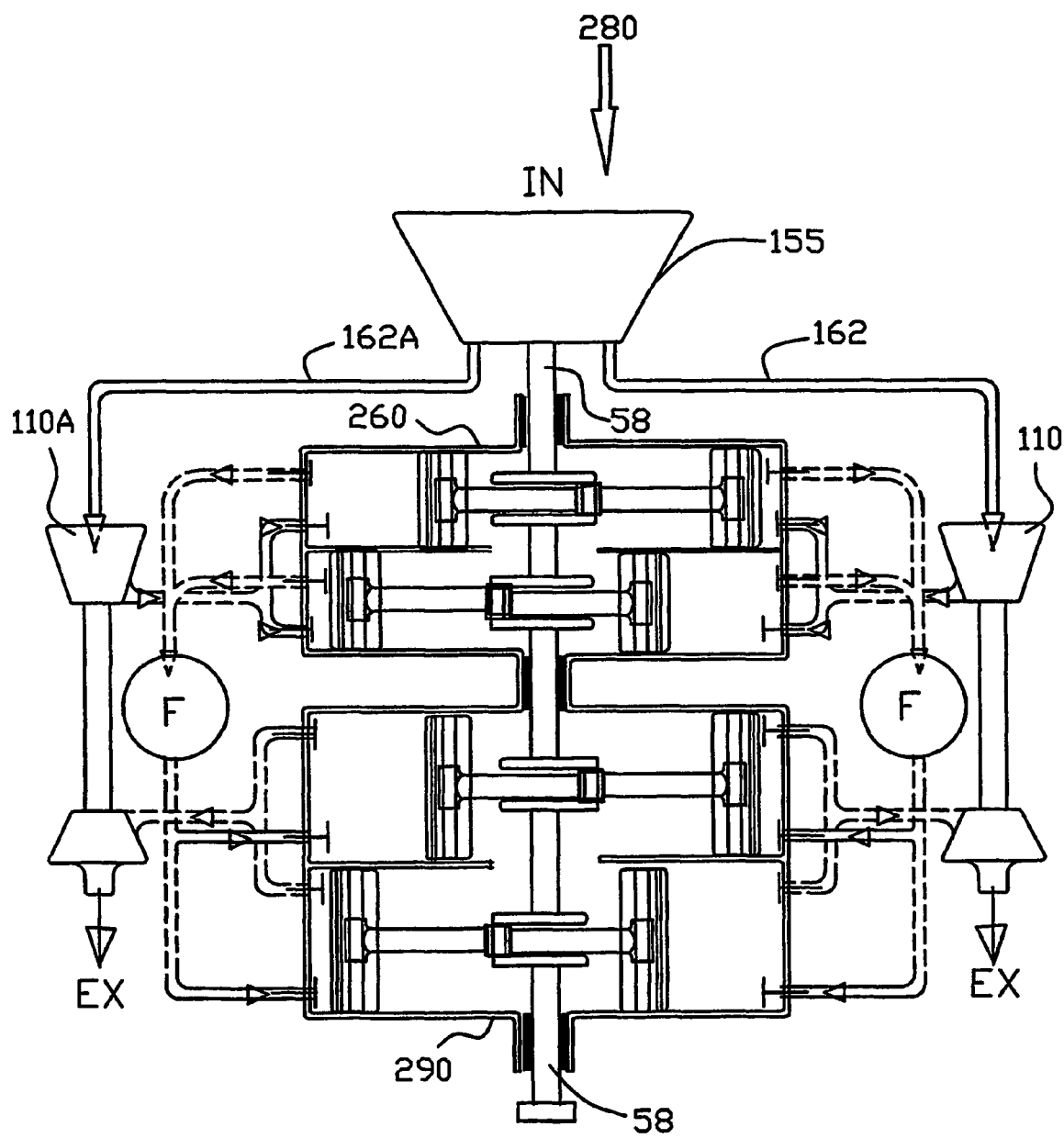

Another volumetric system generally designated by 280 in accordance with the present invention is illustrated in FIG. 8, in which the positive displacement cycle is based on a reciprocating piston system. In FIG. 8, like with any other sort of adoptable volumetric mechanism of the present invention, a wide variety of embodiments with different peripheral systems may be implemented. The following description of FIG. 8 is just one of various possibilities.

Intake air is compressed in two stages, namely by compressor 155 coaxial with volumetric transfer unit 260 and expansion volumetric unit 290 and by turbocompressors 110 and 110A whose inlet is compressed air flowing from compressor 155 through conduits 162 and 162A, respectively. Each controlled volume of turbocharged working fluid is sequentially fed to the first transfer volumetric unit and is sequentially urged from the transfer unit 260 to the expansion volumetric unit 290 by a predetermined timing of valve sets.

Figure 9:
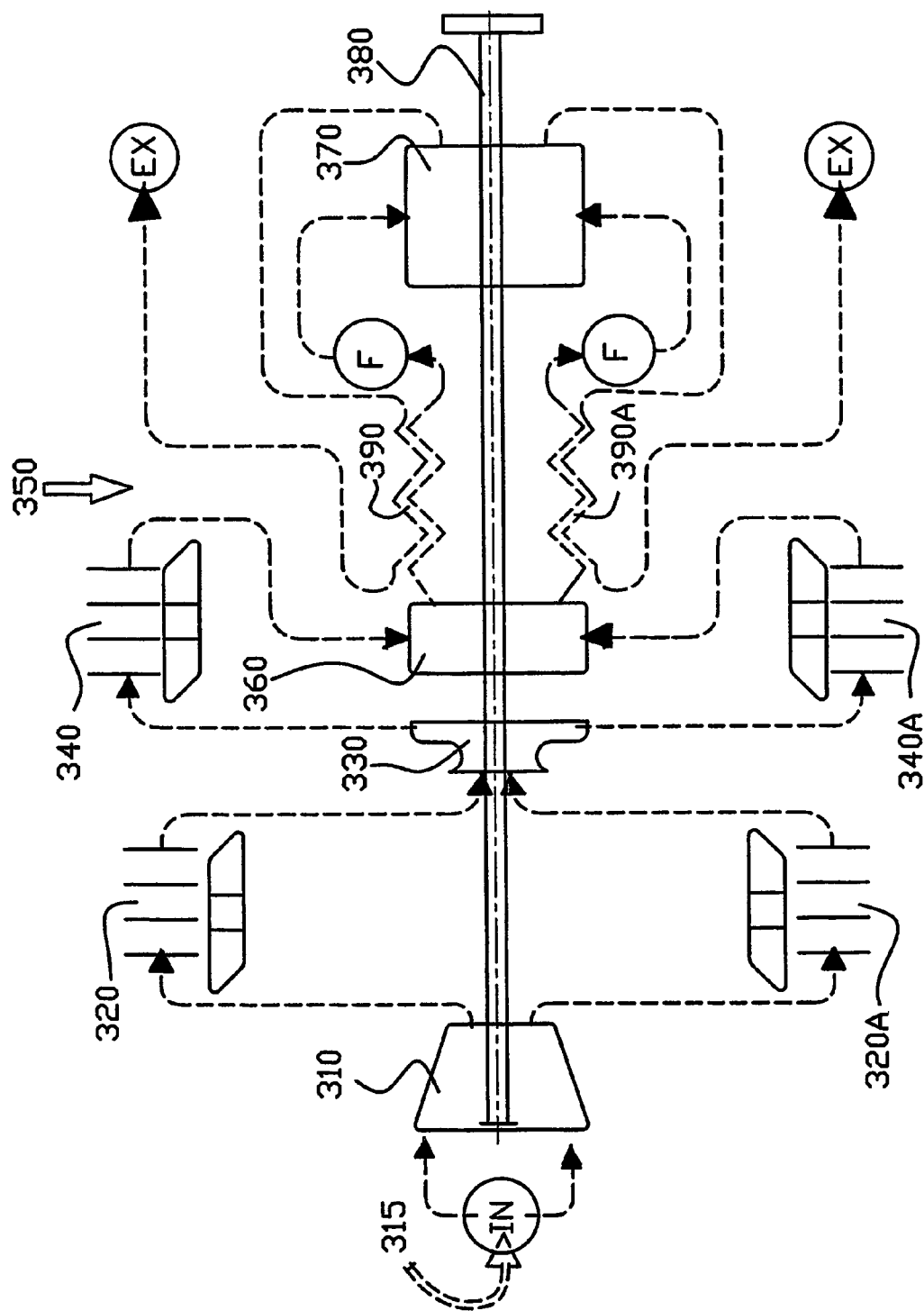

FIG. 9 is an explanatory system which describes the adaptation feasibility of common systems of prior art by the present invented system in order to achieve higher performance and efficiency. An engine is generally indicated by 350, according to another preferred embodiment of the present invention illustrated in FIG. 9, showing the high adaptability of the present invention for common peripheral systems in order to improve efficiency and output that can be further increased by the employment of intercoolers, in order to cool the temperature of compressed working fluid and thereby to provide fluid at higher density to the volumetric devices. Axial compressor 310 forces ambient air 315 to first stage intercoolers 320 and 320A, after which the compressed and cooled air is additionally compressed at radial compressor 330 and second stage intercoolers 340 and 340A, respectively. A higher fluid density therefore results between expansion volumetric unit 370 and transfer volumetric unit 360. Heat exchangers 390 and 390A, are using exhaust gases temperature to preheat the working fluid at entrance to the combustors in order to achieve higher efficiency and output.

With implementation of the various applications described hereinabove, an engine of the present invention may be adapted for use with land motor vehicle of all sorts, which requires a wide variation output in load and rotational speed, with an immediate response to a change in one of the operational parameters of the system. Due to the unique configuration, an engine in accordance with the present invention is advantageously suitable for the burning of any existing engine fuel.

Figure 10A:
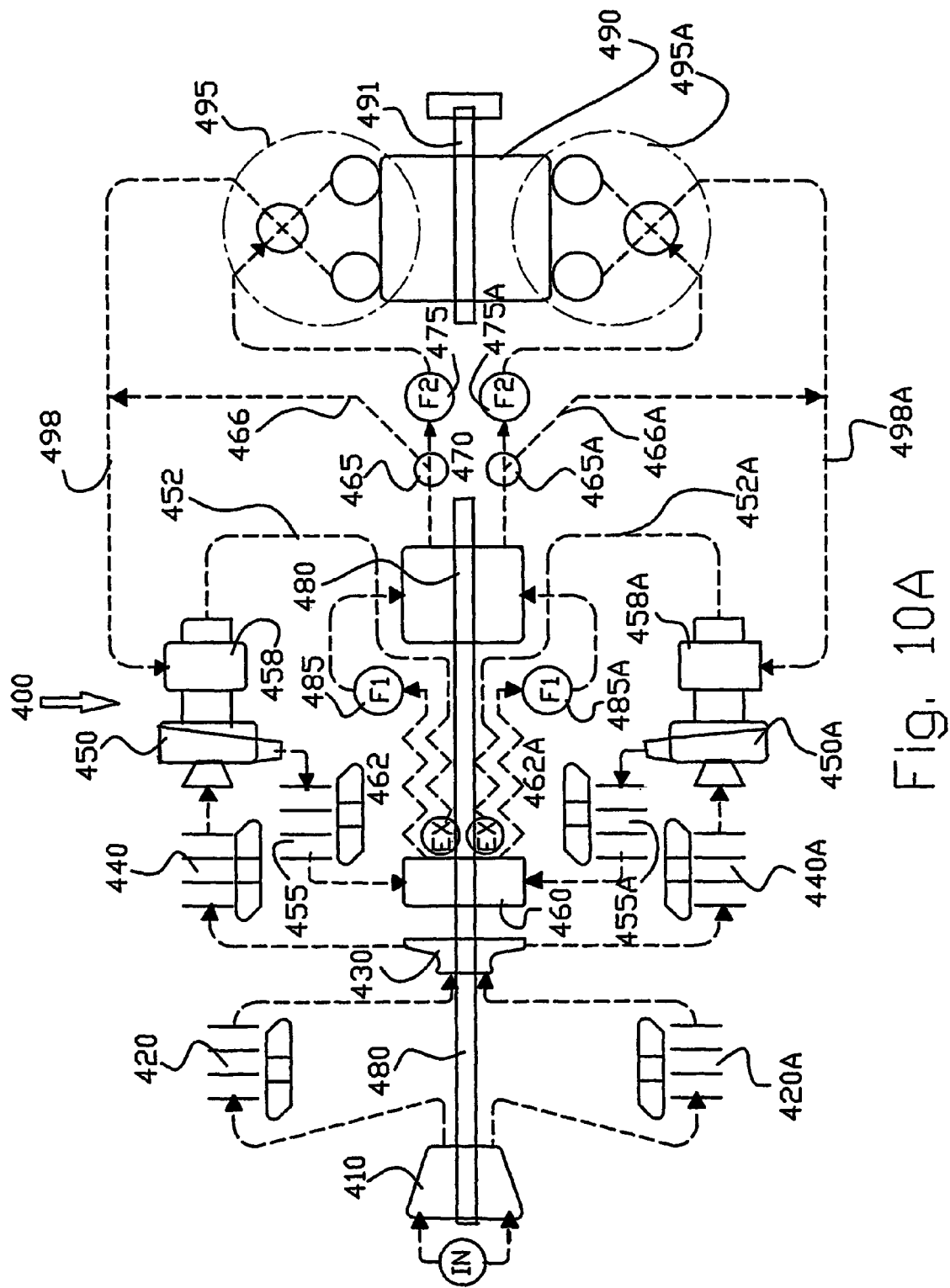

In one preferred embodiment of the invention, engine 400 which is suitable for operation with motor vehicles is illustrated in FIGS. 10A and 10B. Engine 400 comprises three stages of intercoolers: first stage intercoolers 420 and 420A for cooling compressed ambient air from axial compressor 410, second stage intercoolers 440 and 440A for cooling compressed air from radial compressor 430 which compresses the discharge from the first stage intercoolers, and third stage intercoolers 455 and 455A for cooling compressed air from turbocompressors 450 and 450A, respectively, which receive air from a corresponding second stage intercooler. The discharge from the third stage intercoolers is introduced to transfer unit 460. The discharge from transfer unit 460 is heated by heat exchangers 462 and 462A, which utilize the exhaust from turbocompressors 450 and 450A, respectively, as indicated by conduits 452 and 452A, respectively, before introduction into primary combustors 485 and 485A, respectively, so as to increase the available energy level of the working fluid. The fluid heated by the primary combustors flows to expansion unit 470 and performs work at main shaft 480.

The flexibility and efficiency of engine 400 is further increased by providing a third volumetric device 490, which rotates about an independent shaft 491 and transmits an additional amount of power. The exhaust from expansion unit 470 is heated by secondary combustors 475 and 475A, so as to function as a pressure generator for volumetric device 490 by utilizing the oxygen content of the unburned exhaust. The heated exhaust from expansion unit 470 is introduced to selector valves 495 and 495A. As seen more clearly in FIG. 10C, selector valve 495, for example, is actuatable to direct the flow of the expansion unit outlet into inlet port 496 resulting in clockwise rotation of shaft 491 or into outlet port 497 resulting in counterclockwise rotation of shaft 491. The exhaust from volumetric device 490 is then discharged by lines 498 and 498A, respectively, to the turbines of turbocompressors 458 and 458A, respectively, which drive a corresponding turbocompressor. If so desired, the exhaust from volumetric device 490 may be directed to a heat exchanger, or to any other suitable application. Any of the hereinabove peripheral units, such as secondary combustors, intercoolers and heat exchanger, can be in use or not employed, according to any specific design.

Volumetric device 490 develops power by means of any of the positive displacement cycles described hereinabove. Since independent shaft 491 is coupled to a load, volumetric device serves as a torque converter, wherein the torque applied by shaft 491 is variable, depending on the load and on the pressure between expansion unit 470 and volumetric device 490. The volume of device 490 is advantageously relatively small if shaft 491 is desired to be rotated at a relatively high velocity and low torque. Alternatively, (in the invention of WO 03/076779) the volume of device 490 is chosen to be larger if shaft 491 is desired to be rotated at a relatively low velocity and high torque. A locking mechanism is situated between main shaft 480 and secondary shaft 491 in order to enable unification of the two shafts into one for certain utilizations. Bypass valves 465 and 465A are functioning as engagement/disengagement device, enabling to keep the engine running and idling while third volumetric unit (torque converter) is disengaged.

Engine 400 is adapted to provide a flexible and gradual transmission by employing a plurality of volumetric devices, as illustrated in FIG. 10C, disposed at the outlet of secondary combustors 475 and 475A, with a number of selector valves in use to select through which combination of devices working fluid heated by secondary combustors will flow. Working fluid heated by secondary combustors flows in parallel conduits into a corresponding volumetric device, and a separate selector valve in communication with each conduit controls the flow through the corresponding conduit. Each of these volumetric devices is coaxial and the net power output from independent shaft 491 is the sum of the power output from each individual volumetric device. Accordingly, the engine produces a maximum amount of torque when the discharge from the secondary combustors is directed to all the volumetric devices in parallel. If an operator desires to smoothly lower the torque and increase the speed of shaft 491, one selector valve is actuated to prevent the flow to the corresponding individual volumetric device, the same amount of fluid is then flowing through one less device, causing augmentation of velocity on the account of torque diminution.

Similarly any number of volumetric devices may be bypassed in order to achieve a desired speed or torque. The direction of independent shaft 491 is changed by actuating the selector valve of each volumetric device in unison. Preferably the selector valves are automatically actuated upon input of an operator.

Figure 10D:
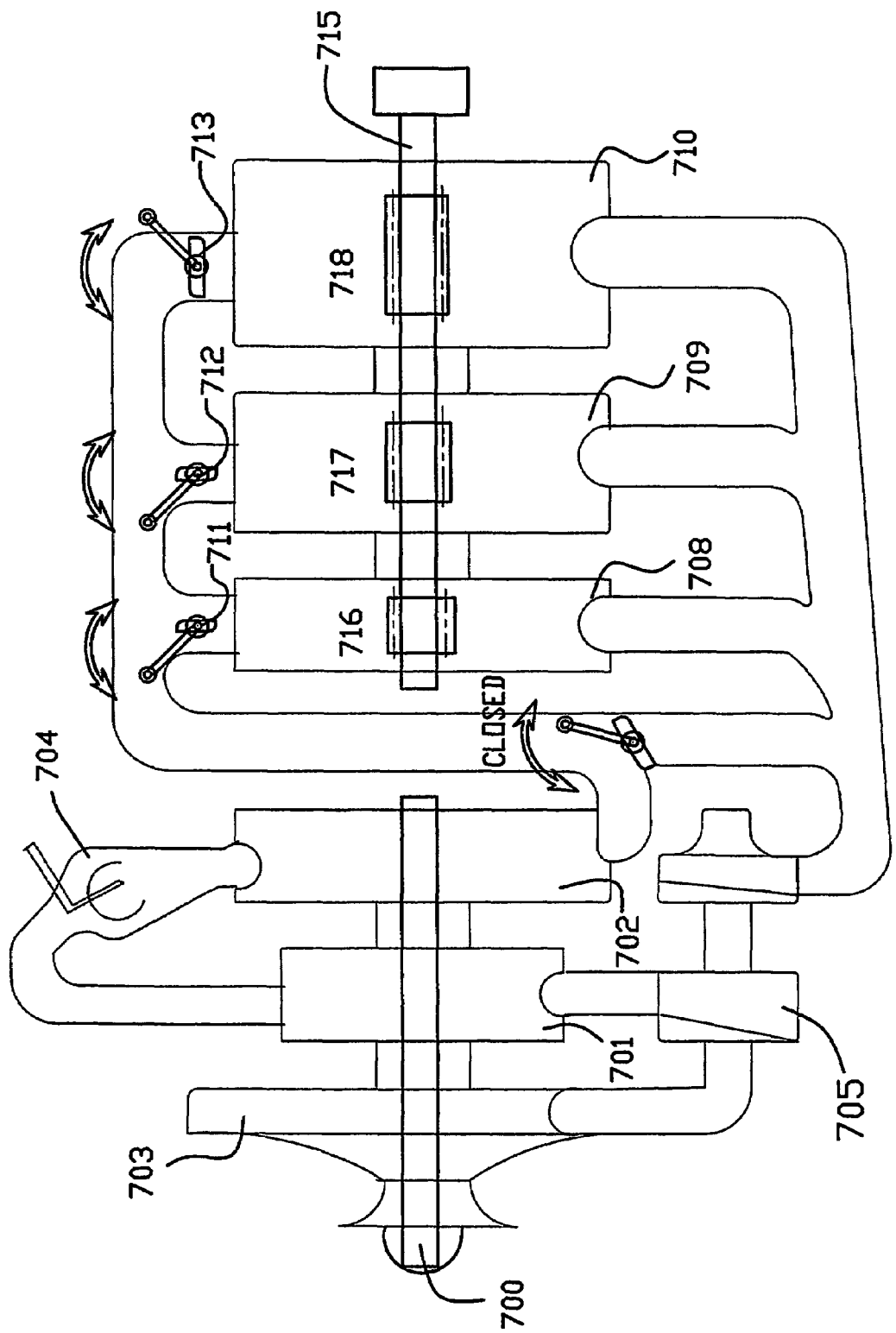
FIG. 10D is a schematic drawing of a motor vehicle transmission system (torque converter) comprising a plurality of coaxial volumetric devices rotatable about an independent shaft and their control system.

FIG. 10D schematically illustrates an engine, comprising, in addition to volumetric devices 701 and 702, such as have been illustrated in preceding embodiments, three additional volumetric devices 708, 709 and 710 that serve as torque converters. Numeral 700 indicates the shaft to which volumetric devices 701 and 702 are keyed 703 is a compressor, 704 is a combustor and 705 is a turbocharger. Said additional volumetric devices 708, 709 and 710 can be activated or deactivated by opening or closing valves 711, 712 and 713 respectively. While volumetric devices 708, 709 and 710 are mounted on shaft 715, they may be mounted through one-way bearings 716, 717 and 718 respectively, so that if they are deactivated, they do not rotate with shaft 715. The said additional volumetric devices vary the torque and the speed of rotation of the engine in two ways: one, by activating appropriate combination of volumetric transmission devices in general accordance with load and speed and secondly by the variation of the pressure buildup in the said volumetric activated units based on the compressible nature of the fluid (usually air) in order to cope with load and speed variations within a chosen combination of transmission volumetric units.

Another preferred embodiment of the present invention is illustrated in FIG. 11, for use as a turbofan engine generally designated as 550. Atmospheric air 510 is admitted to turbocompressors 520 and 520A under normal pressure produced by the fan 530, and is compressed furthermore before delivery to transfer unit 560. Transfer unit 560 discharges the compressed air to combustors 585 and 585A, from which combustion gases flow to expansion volumetric device 570. As the combustion gases expand, a motive force is produced due to the pressure between expansion volumetric device 570 and transfer volumetric device 560, causing shaft 558 to rotate and to drive fan 530. Fan 530 generates a crossfan streamline 515 which flows through duct 590 and results in thrust. The exhaust from device 570 is delivered to turbines 522 and 522A of the turbochargers, in order to drive a corresponding turbocompressor. The exhaust from turbines 522 and 522A is discharged to the atmosphere and provides additional thrust.

Figure 12:
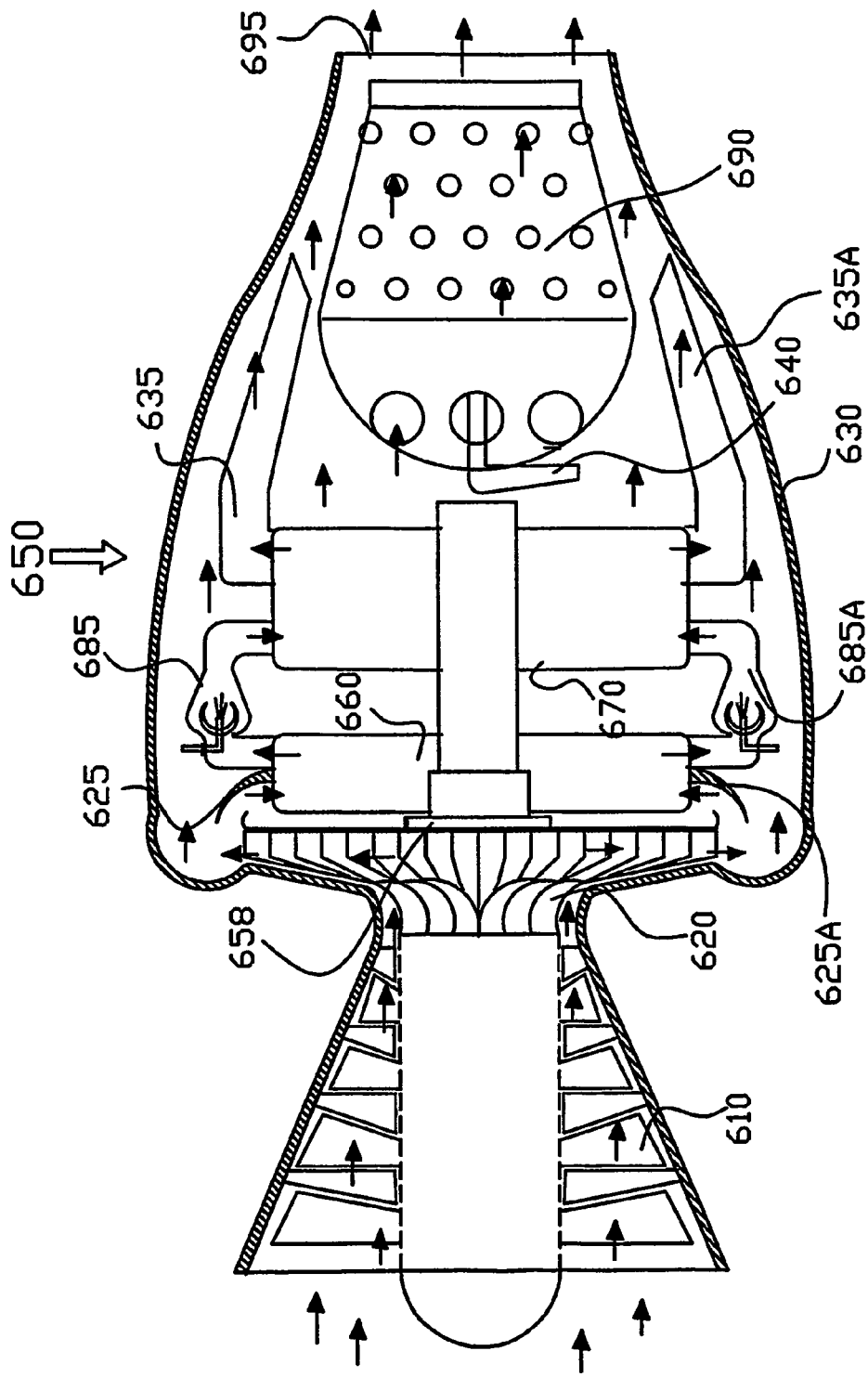

FIG. 12 illustrates another preferred embodiment in which a turbojet engine system indicated generally by 650 comprises axial compressor 610, radial compressor 620, transfer volumetric device 660, engine combustors 685 and 685A, expansion volumetric device 670 and main combustor 690. The majority of the aircraft thrust is provided by main combustor 690. Compressed air from compressors 610 and 620 introduced to main combustor 690 and mixed with fuel injected by injector 640, and the combustible mixture is burned to produce a powerful jet stream. Compressors 610 and 620 are driven by shaft 658, as a result of the torque imparted thereto by device 670. The remainder of the compressed air not admitted to main combustor 690 is cooling the main combustor and its envelope and together with the exhaust from expansion unit 670 provide auxiliary thrust which streams to the rearward side of the engine, through outlet nozzle 695.

It will be appreciated that an aircraft engine corresponding to the embodiment of FIG. 11 or FIG. 12 drives the compressors by means of energy, due to the pressure between the volumetric device, and therefore can operate at high efficiency despite a wide variation in speed and load. Consequently such aircraft engines are suitable for applications that heretofore have been unfeasible.

To mass produce engines according to the present invention in a cost effective manner, one may produce the engines of the present invention in a modular fashion.

Figure 13:
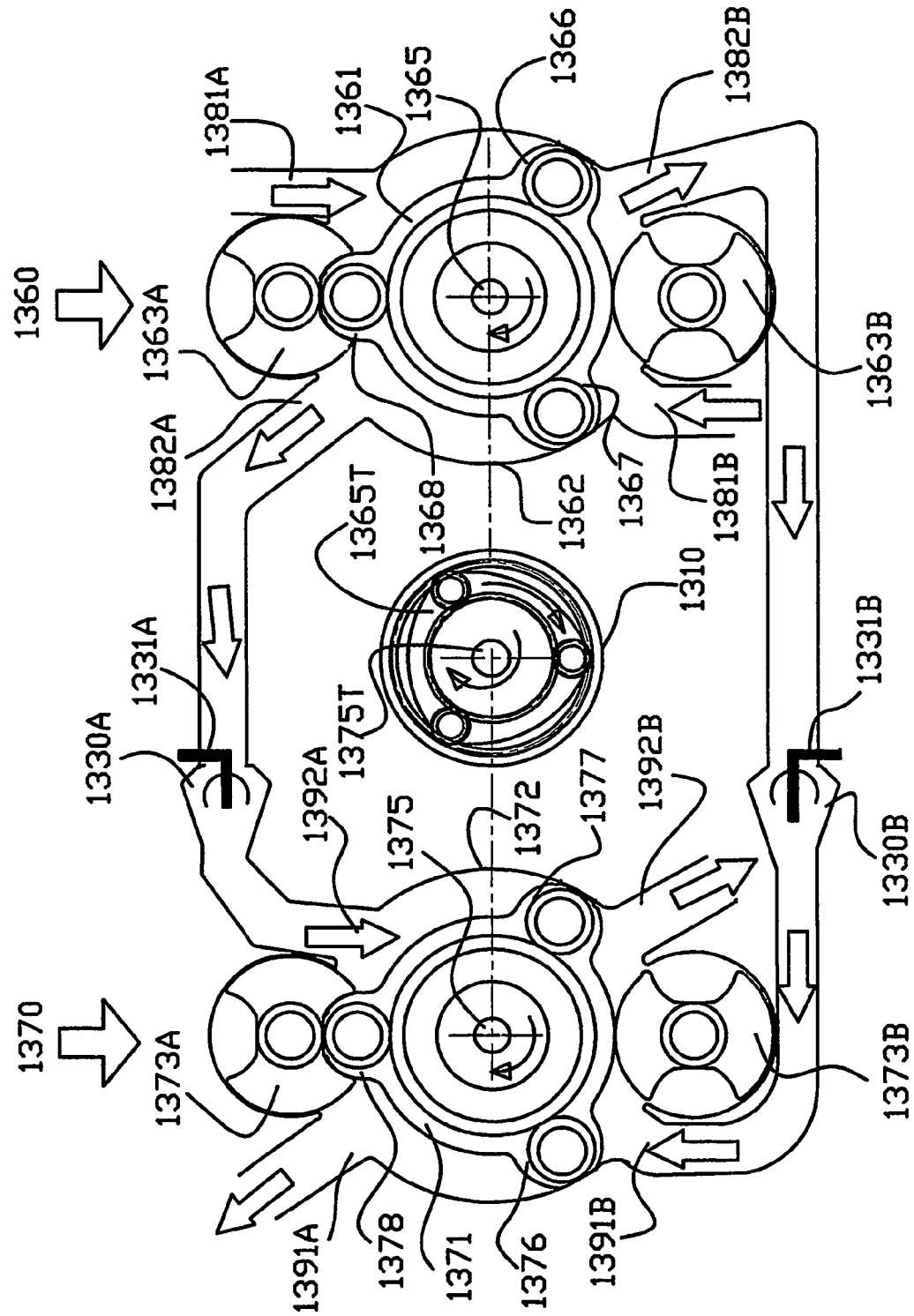
FIG. 13 is a flow diagram of an engine system, illustrating a transmission in engagement with two rotor shafts of corresponding volumetric devices, according to one embodiment of the present invention.

Turning now to a more specific description of the system of the present invention, FIG. 13 is an exploded schematic cross-section view of an engine system according to the present invention, showing the volumetric devices as being laterally displaced from one another, while in fact they are substantially aligned along a common longitudinal axis. Two volumetric units, transfer unit 1360 and expansion unit 1370, are situated in tandem, each containing a rotor 1361 and 1371 respectively, wherein rotor 1361 is fixed to one independent shaft 1365 and rotor 1371 is fixed to another independent shaft 1375. The two independent shafts 1365 and 1375 are engaged by means of transmission 1310 (planetary in this embodiment) by such a ratio that shaft 1375 and rotor 1371 fixed thereto revolve at a higher velocity compared to shaft 1365 and rotor 1361. Buffers 1363A and 1363B of the first volumetric unit 1360 and buffers 1373A and 1373B of the second volumetric unit 1370 rotate synchronously with rotors 1361 and 1371, respectively, to define increased and decreased volumes inside housings 1362 and 1372, respectively. The transfer volumetric unit 1360 is in fluid communication with the expansion volumetric unit 1370 by means of conduits 1382A and 1382B and combustors 1330A and 1330B respectively. Since rotor 1371 rotates at a higher velocity than rotor 1361, the volume which is defined between the two rotors lobes 1366 and 1376 and their housings and between lobes 1367 to lobe 1377 will increase, enabling expansion of the fluid heated in the combustor in order to perform positive work. Due to torque (and velocity) differential between the two units the system rotation is unidirectional under any positive level of pressure. The differential achieved by means of transmission 1310 in the present invention allows to design and to use equal sized, as well as different sized volumetric units, within the same system, which could be achieved only by different sizes of the volumetric units in the invention of WO 03/076779.

Figure 14:
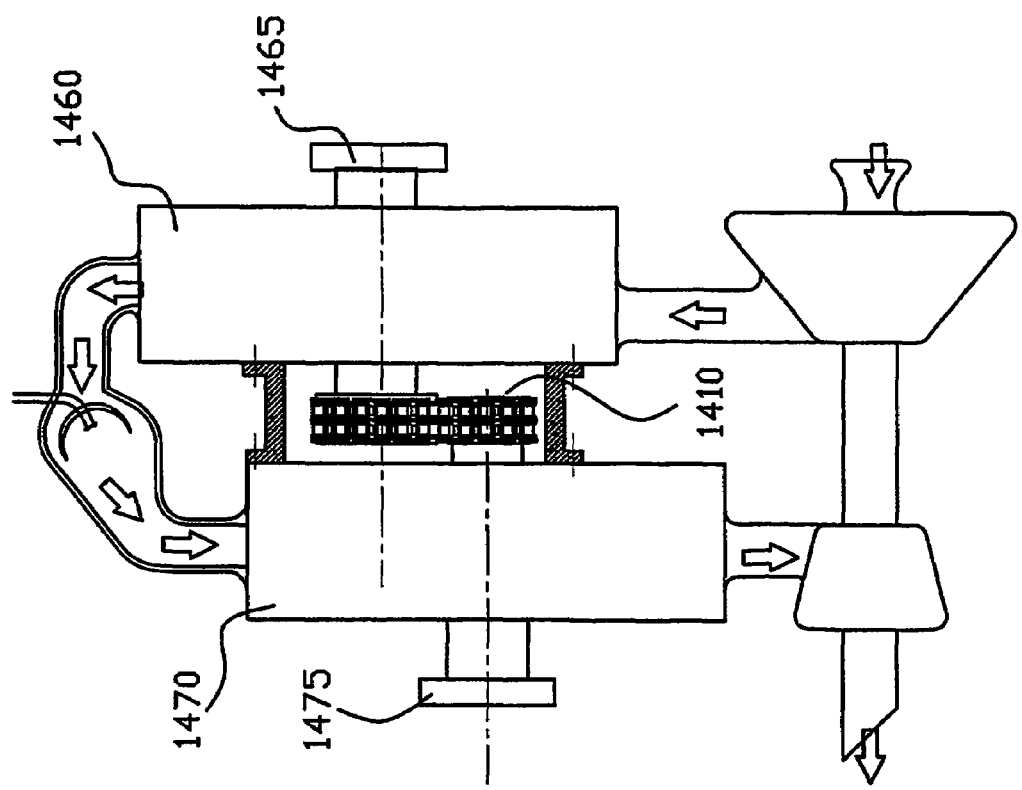
FIG. 14 is a schematic flow diagram of an engine system having two volumetric devices equal in size and volume and a sprocket wheel and chain transmission engaging the shafts of the two volumetric devices by such a ratio that the second volumetric device (expansion) rotates at a higher angular velocity than that of the first volumetric device (transfer)

FIG. 14 demonstrates the basic concept of the present invention: a volumetric device consists of at least two volumetric units; transfer unit 1460 and expansion unit 1470 each rotates on its own shaft (1465 and 1475 respectively). In order to achieve expansion between the said two volumetric units, shaft 1465 and shaft 1475 are engaged to one another by means of a chain and sprocket wheel or toothed belt and wheels transmission 1410 having such a ratio that the expansion unit 1470 rotates at a higher angular velocity than transfer unit 1460.

Figure 15:
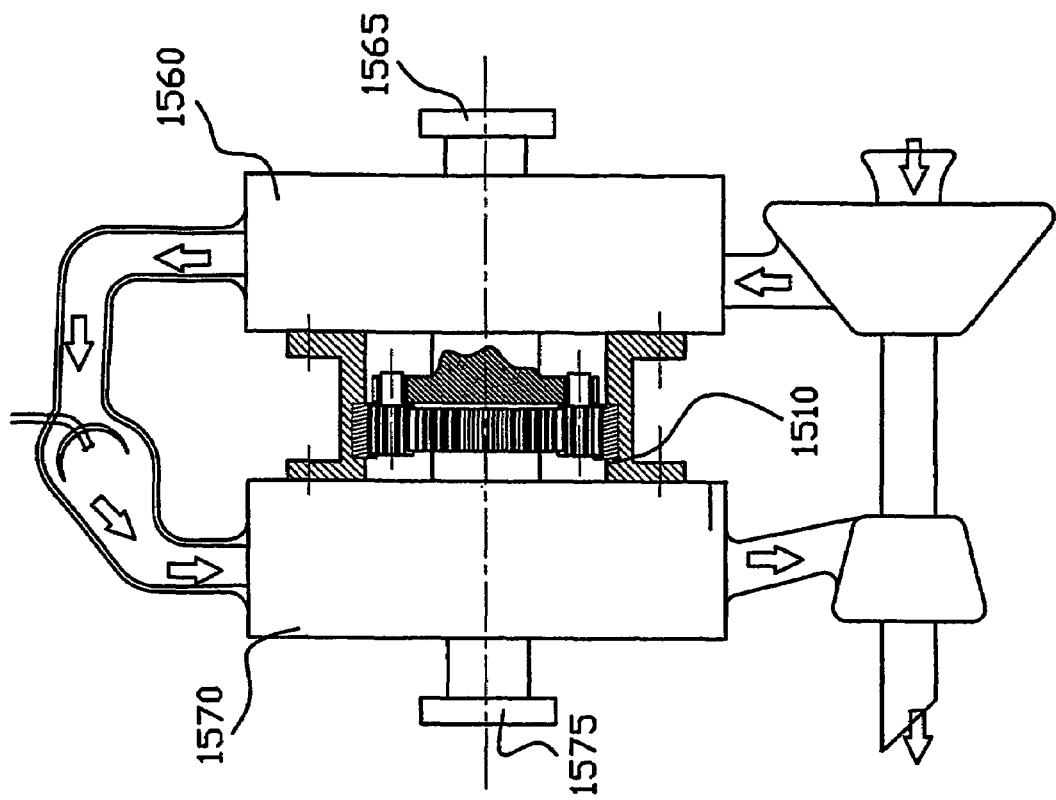
FIG. 15 is a schematic flow diagram of an engine system similar to that of FIG. 14, wherein the transmission engaging the shafts of the two volumetric devices is of a planetary type.

FIG. 15 is a system identical to the one of FIG. 14, except for the type of transmission. In the embodiment of FIG. 15 shaft 1565 of transfer unit 1560 is engaged to shaft 1575 of expansion unit 1570 by means of a planetary type transmission 1510.

Figure 16:
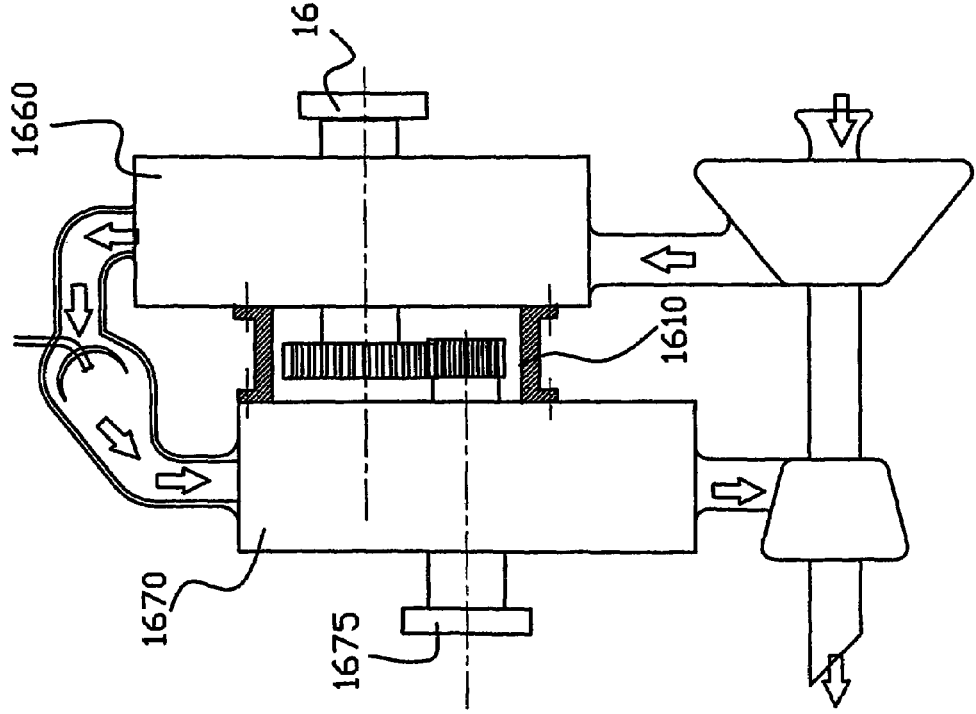
FIG. 16 is a schematic flow diagram of an engine system similar to that of FIG. 14, wherein the transmission engaging the shafts of the two volumetric devices is of a toothed wheel transmission type.

FIG. 16 shows a system similar to that of FIGS. 14 and 15 with the exception of its transmission type. In the system of FIG. 16, shaft 1665 of transfer unit 1660 is engaged to shaft 1675 of expansion unit 1670 by means of a toothed wheel type transmission 1610.

Figure 17:
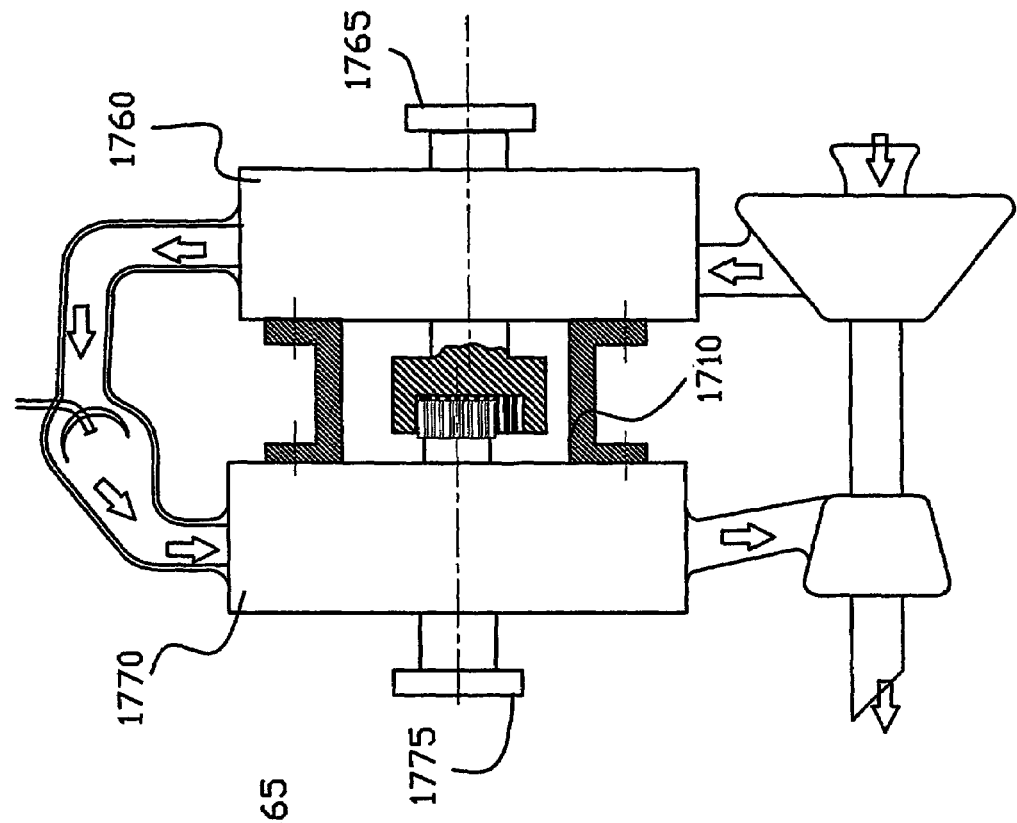
FIG. 17 is a schematic flow diagram of an engine system similar to that of FIG. 14, wherein the transmission engaging the shafts of the two volumetric devices is an internal toothed wheel transmission type.

FIG. 17 is a system similar to those of FIGS. 14 through 16, which uses an internal toothed gear wheel as transmission. In this system shaft 1765 of volumetric unit 1760 is engaged to shaft 1775 of volumetric unit 1770 by means of the internal toothed transmission 1710.

Figure 18:
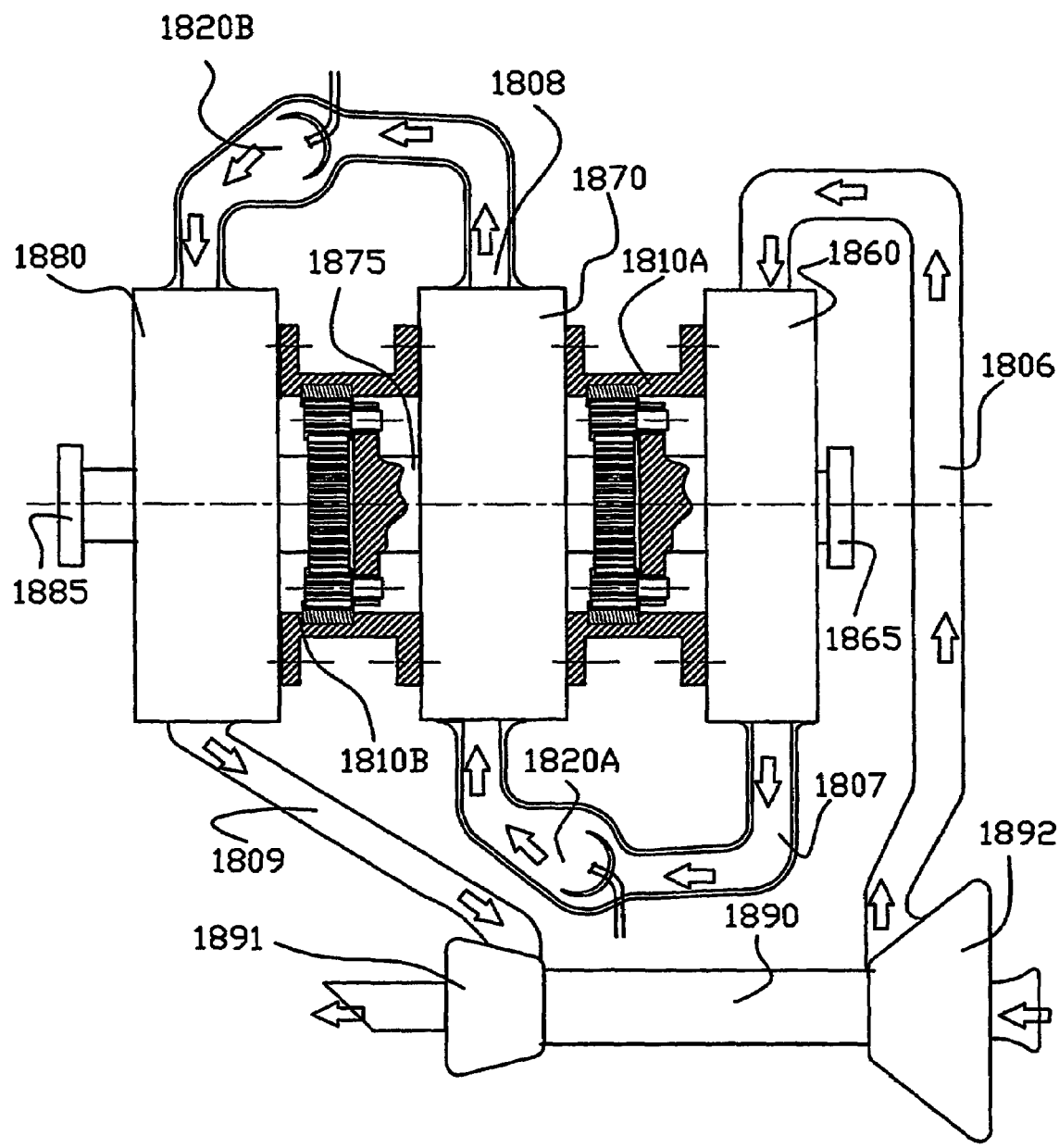
FIG. 18 is a schematic flow diagram of an engine system according to another embodiment of the present invention, employing three multiple volumetric devices engaged in tandem one to another.

FIG. 18 illustrates a multiple volumetric units system (three in this drawing); transfer volumetric unit 1860 is charged from a pressure source, which is a turbo-compressor 1890 in the particular embodiment shown in this figure, via conduit 1806. The compressed fluid is then captured in portions of the volumetric chambers of transfer unit 1860, and transferred under static pressure to the first expansion unit 1870 via conduit 1807 and combustor 1820A, to which fuel is added and ignited, and then burns continuously. The heated fluid (usually air) expands in order to perform positive work at the first volumetric expansion unit 1870. The fluid is discharged from the first volumetric expansion unit 1870 into the second volumetric expansion unit 1880 via conduit 1808 and combustor 1820B. More fuel is added to burn the remaining oxygen in the fluid, in order to obtain higher temperature and pressure in the second expansion unit 1880. Finally, the fluid is discharged into turbine 1891 of turbo-compressor 1890 in order to drive the compressor 1892 of the same turbo-compressor 1890.

Shaft 1865 of volumetric transfer unit 1860 is engaged with shaft 1875 of volumetric expansion unit 1870 by transmission 1810A. As for volumetric expansion unit 1880, it may or may not be engaged with expansion unit 1870, depending on the specific embodiment and design. According to one preferred embodiment, the system may be designed as a unified engine, using transmission 1810B in order to engage shaft 1875 of volumetric expansion unit 1870 with shaft 1885 of volumetric expansion unit 1880 (as shown in the drawing). According to another preferred embodiment of the invention, volumetric expansion unit 1880 may be designed to operate independently as a propulsion-torque-converter unit, while the remaining volumetric units of the system, namely volumetric transfer unit 1860 and volumetric expansion unit 1870, operate as a pressure generator in order to provide volumetric expansion unit 1880 with the pressurized fluid needed for its operation. In this case, shaft 1885 of volumetric expansion unit 1880 remains independent and is not engaged with other volumetric units of the system (not shown in the drawing), operating as the power output shaft of the system.

Figure 19:
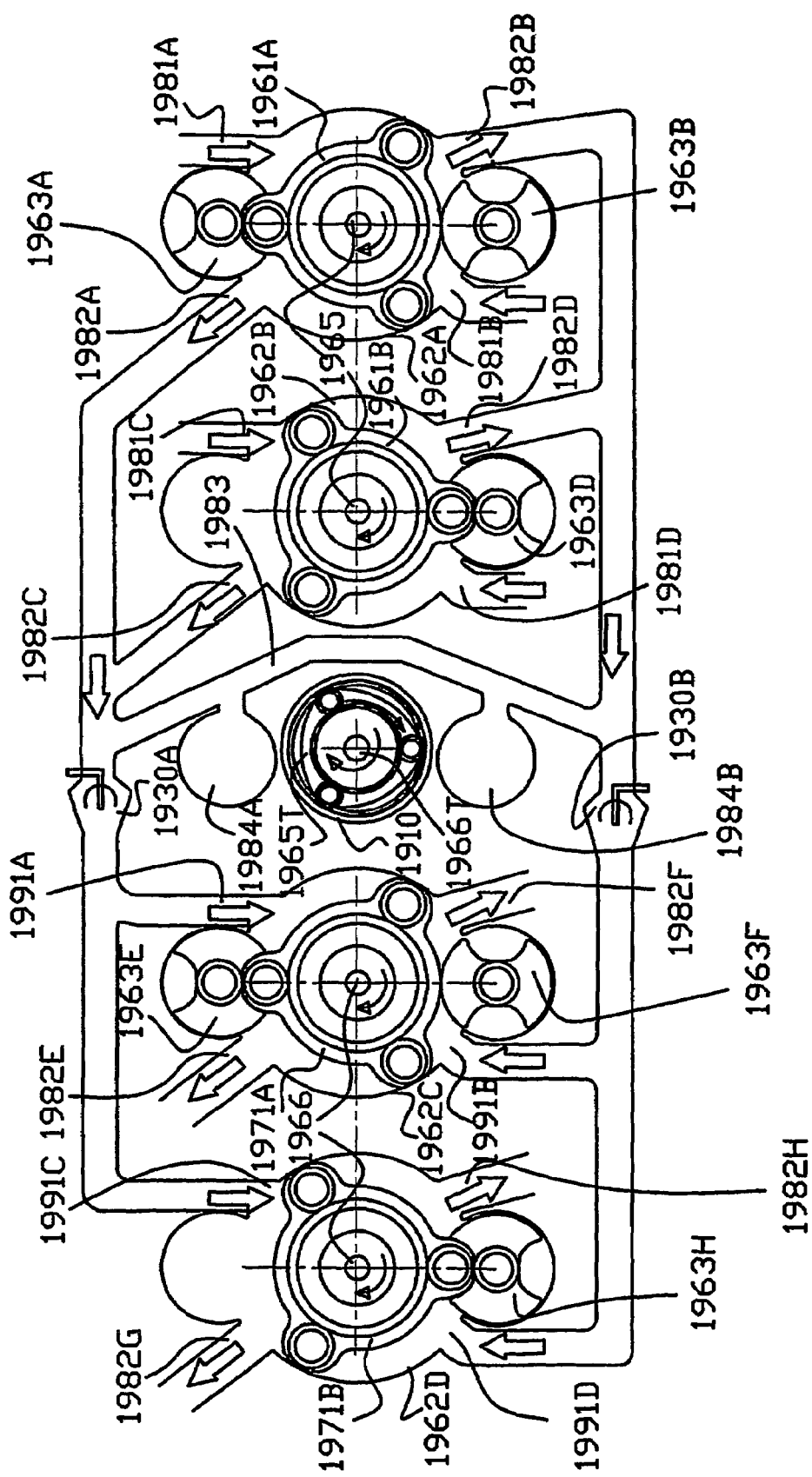
FIG. 19 is a schematic flow diagram of an engine system according to another embodiment of the present invention in which each single combustor is fed by two volumetric devices with sufficient angular deviation to minimize a pulsing effect on the flow through the combustor and the outlet of each combustor is directed to a multiple volumetric unit for the same purpose, further illustrating a conduit provided with at least one pressure compensation chamber which connects between the inlets of all the combustors of the system.

FIG. 19 illustrates a system in which each combustor (two in this drawing) 1930A and 1930B is fed by more then one volumetric unit (two in this drawing) 1962A and 1962B, in order to achieve a smoother fluid flow into the combustors 1930A and 1930B and to minimize a pulsing effect. The rotors 1961A and 1961B of the transfer units 1962A and 1962B, respectively, are mounted on a common shaft 1965 by a mutual angular deviation in a way that enables continuous flow of the fluid into and out of the combustors.

Compressed fluid (usually air) from the compressor device (s) feeds volumetric units 1962A and 1962B through inlets 1981A-D and is then transferred volumetrically into the combustors 1930A and 1930B via conduits 1982A-D. In the combustors 1930A-B, fuel is injected and burns continuously, expanding volumetrically, together with the fluid, into expansion volumetric units 1962C and 1962D through conduits 1991A-D in order to perform positive work, until being discharged via conduits 1982E-H. The rotors 1971A and 1971B of expansion volumetric units 1962C and 1962D, respectively, are mounted on their common shaft 1966. Shaft 1966 is connected to the faster sun gear 1966T of a planetary type transmission 1910 while the common shaft 1965 of rotors 1961A and 1961B is connected to the slower satellite carrier 1965T of the same planetary type transmission 1910 in order to achieve volumetric expansion between the transfer and expansion units of the system. A further smoothness of flow is achieved by the pressure compensators 1984A and 1984B and the connecting conduit 1983, which connect the main conduits of the system (two in this drawing) in order to absorb and compensate for pulses in the flow of fluid through the combustors.

Figure 24:
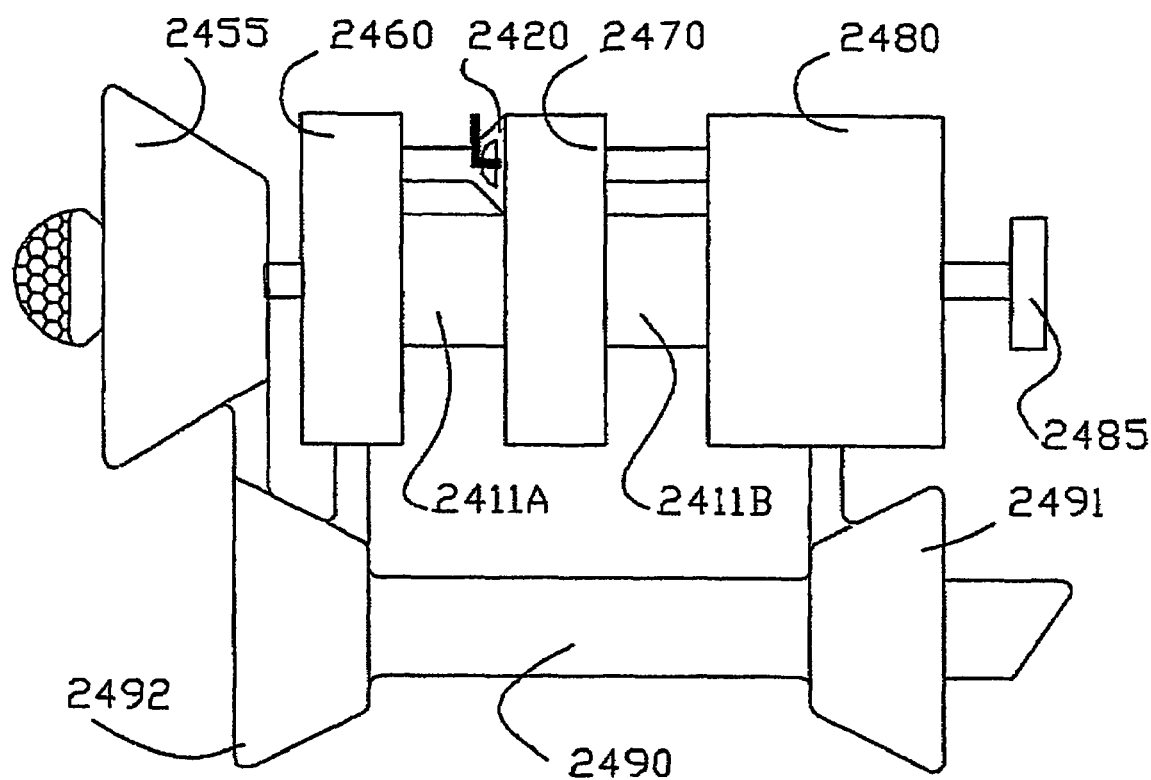
FIG. 24 is a schematic drawing of yet another embodiment of an engine system, employing a continuous, variable speed transmission.

FIG. 24 schematically illustrates another embodiment of the engine system according to the present invention wherein the transmission engaging the volumetric devices is of a continuous, variable speed type. As shown, three different volumetric devices 2460, 2470, and 2480 are employed, and the speed ratio between two of the corresponding rotors thereof is controlled by means of continuous, variable speed transmissions 2411A and 2411B. Transmissions 2411A and 2411B may be of any suitable type of commercially available or custom made continuous variable speed transmission. By employing a continuous variable speed transmission, the flexibility of the engine system in terms of load and speed is further increased. In response to engine load and speed, the speed ratio is automatically increased under heavy loads by increasing the expansion ratio and is automatically decreased under light loads by decreasing the expansion ratio.

The cycle of the engine of FIG. 24 commences as flow compressor 2455 compresses ambient air and introduces the same into the secondary compressor 2492 of the turbo-compressor unit 2490. The air is further compressed by compressor 2492 reaching a suitable working pressure and is then delivered to the first volumetric device 2460. The compressed air is then transferred through a combustor 2420 into the second volumetric device 2470, the rotor of which is engaged with the rotor of the first volumetric device 2460 by means of continuous, variable speed transmission 2411A, in order to control the expansion ratio between the first and second volumetric devices. After a sufficient pressure is build up in the second volumetric device 2470, the working fluid is delivered the third volumetric device 2480, in order to perform positive work through power output shaft 2485. In some preferred embodiments, the output shaft is independent and not connected to the shaft of second volumetric device 2470. In other embodiments, output shaft 2485 and the rotor shaft of volumetric device 2470 are engaged by means of a constant ratio transmission, while the rotor shaft of third volumetric device 2480 is engaged with the rotor shaft of second volumetric device 2470 by means of continuous, variable speed transmission 2411B, as illustrated.

Figure 20:
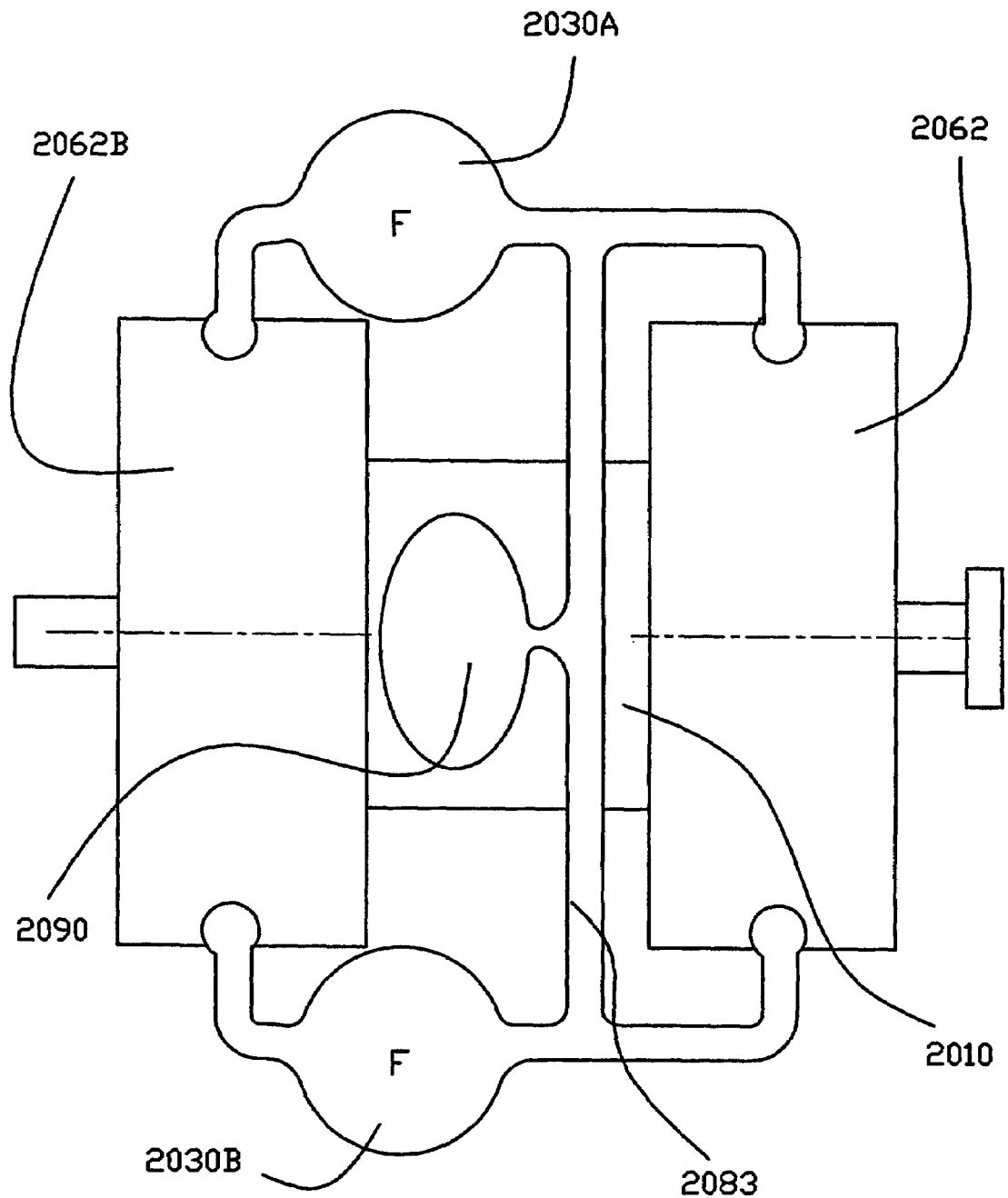
FIG. 20 is a schematic drawing which demonstrates the use of a connecting line and compensating chambers as a means of smoothing the flow into single volumetric device fed combustors.

FIG. 20 schematically illustrates the usage of connection conduit 2083 and compensating chamber 2090 in an engine system of a single transfer volumetric unit 2062 and a single expansion volumetric unit 2062B. As in FIG. 19, it connects the main conduits leading to combustors 2030A and 2030B in order to absorb and compensate pulses in the flow into the combustor.

Figure 21:
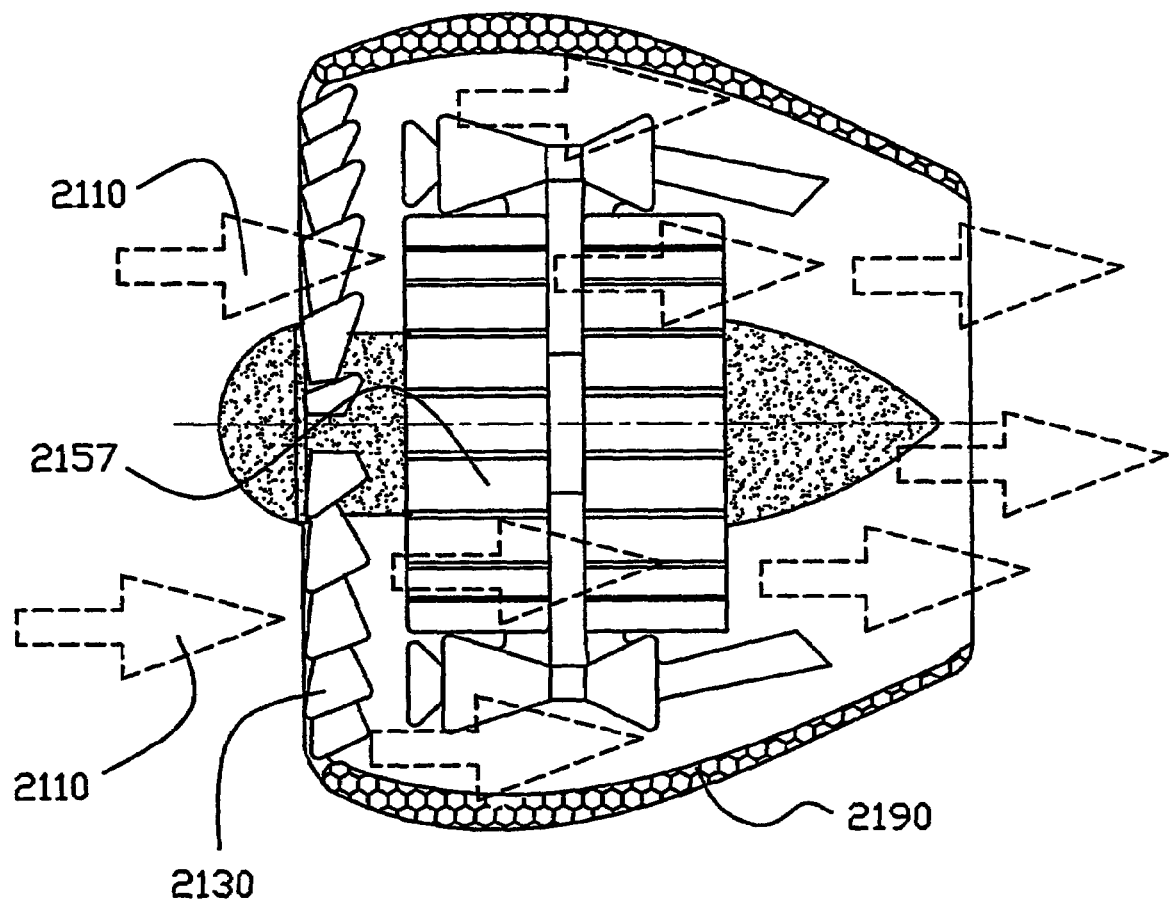
FIG. 21 is a schematic drawing of a turbofan engine system which utilizes evacuated heat in order to increase thrust and improve general efficiency.

FIG. 21 demonstrates a built-in characteristic of the system of the invention by embodying a thrust engine (turbofan and turbojet, turbofan in this drawing). In this engine, the ambient intake air 2110 is forced into the engine envelope by fan 2130 in order to produce thrust at the other end of the engine. A portion of the generated air stream that functions as thrust also feeds the inlet of the turbo-compressors of the volumetric system, which in turn drives the fan. Heat which is evacuated from the engine is transferred to the air stream in the vicinity of the volumetric devices by means of cooling fins 2157 or radiators (not shown) inside the engine envelope. As the temperature of the air stream in the vicinity of the volumetric devices increases, the air expands and the thrust correspondingly increases at the outlet of the engine. In addition, exhaust gases of the volumetric system are combined with the generated air stream, thereby adding thrust and efficiency to the system.

Figure 22:
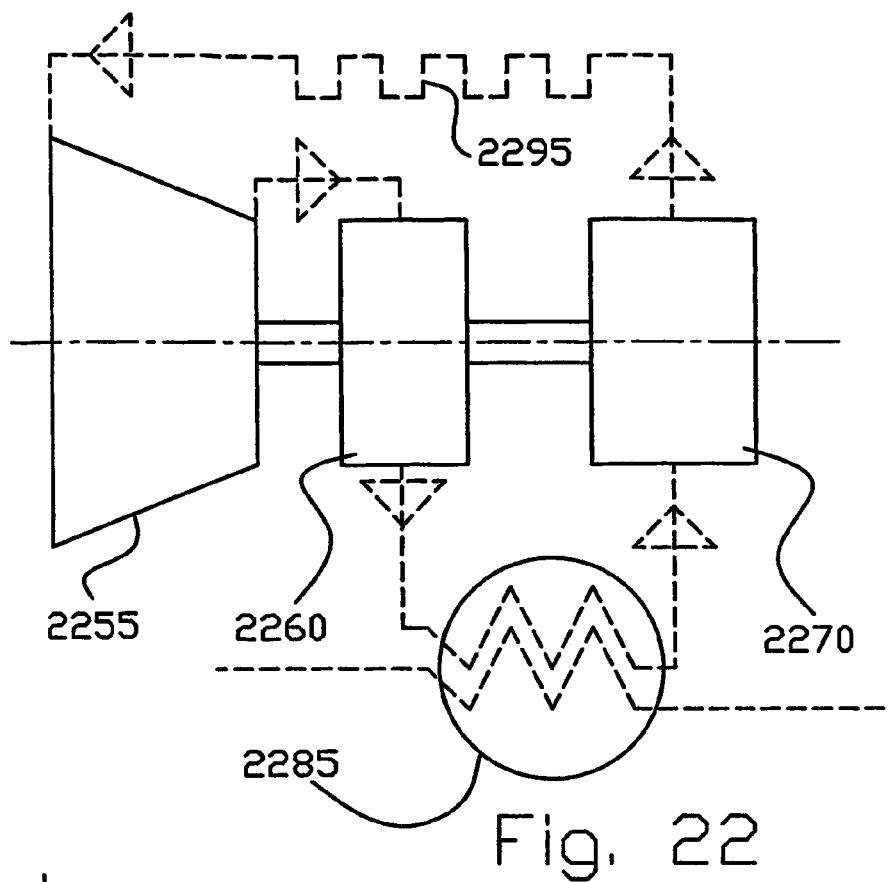
FIG. 22 is a schematic flow drawing of an engine system that operates in a close process utilizing an external source of heat supply.

FIG. 22 illustrates an engine system according to the present invention, which operates in a close process utilizing an external source of heat supply. Compressor 2255 charges working fluid to transfer volumetric unit 2260, which is in fluid communication with expansion volumetric unit 2270 by means of heat exchanger unit 2285. The working fluid in the heat exchanger unit 2285 is heated by an external source of heat, whether a direct source produced intentionally for the system or a by-product of a heat producing process. The heated working fluid then expands within the expansion volumetric unit 2270 while performing positive work. After being discharged from the expansion unit 2270, the working fluid passes through a cooling unit 2295 and completes the cycle by entering into the compressor 2255 to commence a new cycle.

Figure 23:
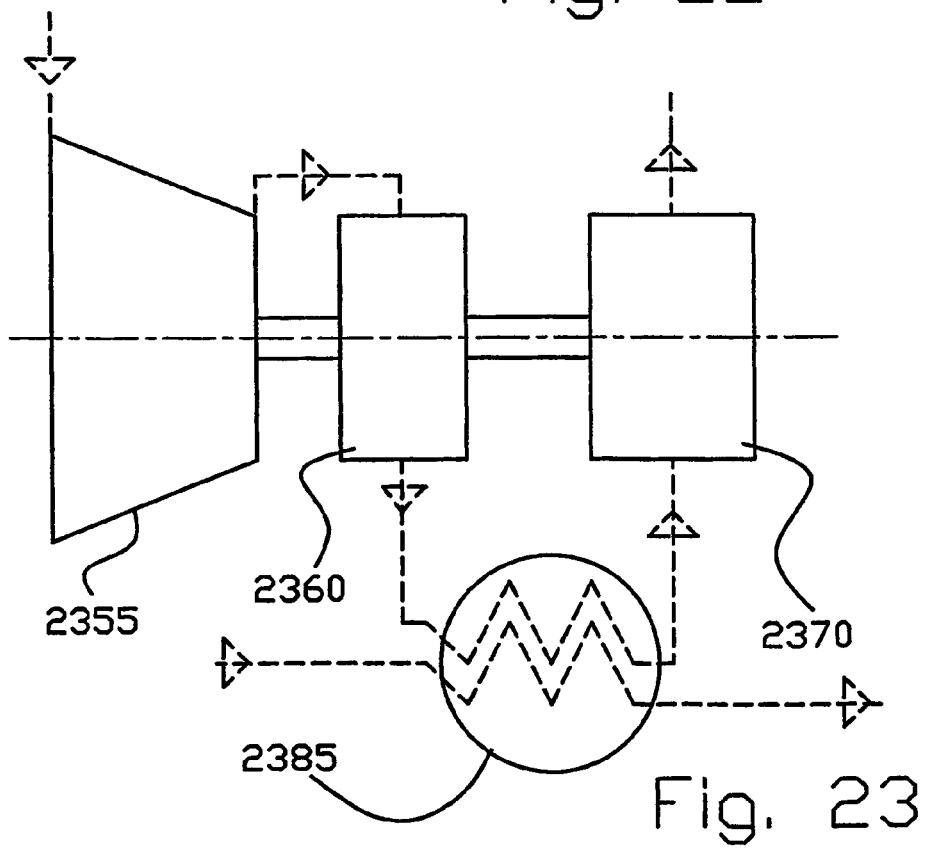
FIG. 23 is a schematic flow drawing of an engine system that operates in an open process utilizing an external source of heat supply.

FIG. 23 is a schematic drawing of the engine system similar to that shown in FIG. 22, but which operates in an open process. Compressor 2355 charges volumetric transfer unit 2360 that is in fluid connection with the expansion volumetric unit 2370 by means of a heat exchanger unit 2385. In the heat exchanger unit 2385, the working fluid is heated by an external source of heat, whether a direct source produced intentionally for the system or a by-product of a heat producing process. The heated working fluid expands within the volumetric expansion unit 2370 performing positive work and is then discharged to the atmosphere.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. Engine system, comprising:
    a) a first positive displacement, transfer volumetric device fed from a compressor or from a turbocompressor;
    b) at least one second positive displacement, volumetric device; and
    c) transmission means in engagement with two adjacent volumetric devices, said transmission means having a ratio designed to cause said at least one second volumetric device to rotate at a higher angular velocity than said first volumetric device to induce expansion of a compressible fluid during continuous flow from said first volumetric device to said at least one second volumetric device and to perform work.

2. Engine system according to claim 1, further comprising:
    a) one or more separate flow paths for a compressible fluid, each flow path beginning with a separate intake conduit leading to the first volumetric device and ending with a separate discharge conduit coming from the outlet of the at least one second volumetric device, each separate flow path being provided with a heat source disposed between the first volumetric device and a second volumetric device such that said second volumetric device receives heated controlled volumes of said fluid from the corresponding heat source via the corresponding separate flow path;
    b) means for feeding the compressible fluid to the first volumetric device via a corresponding separate flow path;
    c) means for driving the first volumetric device for sequentially transferring controlled volumes of said fluid to the corresponding heat source by positive displacement cycles;
    d) means for driving the at least one second volumetric device for sequentially discharging said heated controlled volumes of said fluid by positive displacement cycles; and
    e) means for synchronizing said means for driving said first and at least one second volumetric devices.

3. Engine system according to claim 2, further comprising an additional work producing device selected from the group of a turbine driven by the fluid discharged from a second volumetric device or from a third volumetric device, a compressor for feeding a compressible fluid to the first volumetric device, a turbine keyed to the main shaft, at least one turbocompressor, a secondary heater, at least one stage of intercoolers, a second compressor and a first stage intercooler for cooling the discharge flowing from a first compressor to a second compressor, and a turbocompressor and a second stage intercooler for cooling the discharge flowing from said second compressor to said turbocompressor.

4. Engine system according to claim 2, wherein the means for synchronizing the means for driving the first and at least one second volumetric devices comprise a common shaft to which the first and at least one second volumetric devices are keyed or independent shafts supporting said first and at least one second volumetric devices for rotation.

5. Engine system according to claim 2, wherein each heat source is a combustor fed with a fuel, which receives controlled volumes of fluid and causes said fuel to burn, thereby heating and expanding said fluid.

6. Engine system according to claim 3, wherein the compressor is keyed to the main shaft.

7. Engine system according to claim 1, wherein the first and second volumetric devices are selected from the group consisting of rotors provided with lobes, Wankel mechanism, reciprocating piston systems, or any common or specially designed volumetric mechanism.

8. Engine system according to claim 1, comprising two independent shafts to one of which are keyed pressure generating volumetric devices, a load being coupled to the other shaft to which is keyed at least one output work generating expansion volumetric device, and optionally further comprising a clutch for engaging and disengaging two independent shafts, depending on a magnitude of the load.

9. Propulsion system, comprising an engine system according to claim 1 and further comprising a third volumetric device rotating about an independent shaft, wherein the discharge from a second volumetric device is the working fluid of said third volumetric device, said third volumetric device being adapted to be a torque converter in response to a variable load coupled to said independent shaft, said propulsion system further comprising a rotational direction controller of said independent shaft by a valve means which directs said discharge from a second volumetric device alternatively to an inlet port and an outlet port of said third volumetric device.

10. Propulsion system according to claim 9, wherein the torque converter comprises:
    a) a plurality of coaxial third volumetric devices rotatable about the independent shaft;

b) a plurality of conduits through which the discharge from a second volumetric device flows in parallel to each of said plurality of third volumetric devices, respectively;

c) a plurality of first selector valves provided with each of said plurality of third volumetric devices, respectively, for changing the rotational direction of the independent shaft by directing the flow through a corresponding conduit alternatively between an inlet port and outlet port of the corresponding third volumetric device upon actuation of each of said first selector valves in unison; and d) a plurality of second selector valves in communication with each of said conduits, respectively, for selecting through which combination of said plurality of third volumetric devices discharge from a second volumetric device will flow, wherein said propulsion system produces a maximum amount of torque when the discharge from a second volumetric device is directed to all of said plurality of third volumetric devices in parallel, a lowered level of torque upon deactivation of at least one of said third volumetric devices, and an increased level of torque upon activation of at least an additional one of said third volumetric devices.

11. Propulsion system according to claim 9, further comprising a bypass valve to serve as an engagement and disengagement device between an engine assembly and a torque converter assembly, for repressing the torque converter while the engine is in operation.

12. Propulsion system according to claim 10, further comprising a secondary combustor for heating the discharge from a second volumetric device, wherein the discharge from said secondary combustor is the working fluid of said plurality of third volumetric devices.

13. Propulsion system according to claim 12, wherein the discharge from the secondary combustor flows in parallel to each of the plurality of third volumetric devices, respectively, the plurality of second selector valves selects through which combination of the plurality of third volumetric devices discharge from the secondary combustor will flow, and a maximum amount of torque is produced when the discharge from the secondary combustor is directed to all of the plurality of third volumetric devices in parallel.

14. Turbofan engine system, comprising an engine system according to claim 3, wherein the compressor is a turbocompressor driven by discharge from an expansion volumetric device and a fan driven by said engine system, said fan generating a crossfan streamline and a main thrust for an aircraft, exhaust from said turbocompressor being discharged to the atmosphere and providing auxiliary thrust in addition to said main thrust.

15. Turbojet engine system, comprising an engine system according to claim 3, further comprising a main combustor for generating a gas stream and providing a main thrust for an aircraft, exhaust from said engine system being discharged to the atmosphere and providing auxiliary thrust in addition to said main thrust.

16. Engine system according to claim 1, wherein the volumetric devices are of the same volume.

17. Engine system according to claim 1, wherein the volumetric devices are of a different volume.

18. Engine system according to claim 1, wherein the transmission means engaging the volumetric units is of a sprocket wheel and a chain type.

19. Engine system according to claim 1, wherein the transmission means engaging the volumetric units is of a planetary type.

20. Engine system according to claim 1, wherein the transmission means engaging the volumetric units is of a toothed wheel type.

21. Engine system according to claim 1, wherein the transmission means engaging the volumetric units is of a toothed belt and wheel type.

22. Engine system according to claim 1, wherein the transmission means engaging the volumetric units is of a continuous, variable speed type.

23. Engine system according to claim 1, wherein a plurality of volumetric devices of equal and/or different volumes are serially engaged to one another by means of a transmission with a corresponding ratio.

24. Engine system according to claim 1, wherein a plurality of volumetric devices of equal and/or different volumes are assembled in side by side order and are engaged to one another by means of a transmission with a corresponding ratio.

25. Engine system according to claim 1, wherein the heat is supplied from an external source.

26. Engine system according to claim 25, wherein the work process is of a closed type.

* * * * *